United States Patent
Hiasa et al.

(10) Patent No.: US 8,836,844 B2
(45) Date of Patent: Sep. 16, 2014

(54) IMAGE PICKUP APPARATUS FOR OBTAINING LIGHT FIELD

(75) Inventors: Norihito Hiasa, Utsunomiya (JP); Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 7 days.

(21) Appl. No.: 13/593,652

(22) Filed: Aug. 24, 2012

(65) Prior Publication Data

US 2013/0057749 A1 Mar. 7, 2013

(30) Foreign Application Priority Data

Aug. 29, 2011 (JP) ................. 2011-185403

(51) Int. Cl.
*H04N 5/225* (2006.01)
*G02B 27/10* (2006.01)
*H04N 5/238* (2006.01)
*H04N 5/232* (2006.01)

(52) U.S. Cl.
CPC .............. *H04N 5/238* (2013.01); *H04N 5/2254* (2013.01); *H04N 5/23229* (2013.01)
USPC .......................................... 348/340; 359/626

(58) Field of Classification Search
USPC ........................ 348/222.1, 335, 340; 359/626
See application file for complete search history.

(56) References Cited

U.S. PATENT DOCUMENTS

| | | | | |
|---|---|---|---|---|
| 7,259,917 B2 * | 8/2007 | Hillis et al. | ................... | 359/619 |
| 8,189,089 B1 * | 5/2012 | Georgiev et al. | .............. | 348/343 |
| 8,248,515 B2 * | 8/2012 | Ng et al. | ....................... | 348/343 |
| 8,502,911 B2 * | 8/2013 | Yamamoto et al. | ........... | 348/343 |
| 8,514,318 B2 * | 8/2013 | Hiasa et al. | .................... | 348/340 |
| 8,648,955 B2 * | 2/2014 | Kang et al. | ..................... | 348/335 |
| 8,675,114 B2 * | 3/2014 | Watanabe et al. | .............. | 348/335 |
| 8,724,014 B2 * | 5/2014 | Ng et al. | ....................... | 348/349 |
| 2008/0165270 A1 * | 7/2008 | Watanabe et al. | ............. | 348/340 |
| 2008/0266655 A1 * | 10/2008 | Levoy et al. | .................. | 359/368 |
| 2008/0309813 A1 * | 12/2008 | Watanabe | ..................... | 348/340 |
| 2009/0128669 A1 * | 5/2009 | Ng et al. | ....................... | 348/241 |
| 2009/0185801 A1 * | 7/2009 | Georgiev et al. | .............. | 396/332 |
| 2009/0190022 A1 * | 7/2009 | Ichimura | ....................... | 348/340 |

(Continued)

FOREIGN PATENT DOCUMENTS

| | | |
|---|---|---|
| JP | 2007-004471 A | 1/2007 |
| JP | 2008-167395 A | 7/2008 |
| JP | 2008-172347 A | 7/2008 |

OTHER PUBLICATIONS

Ren NG, et al., "Light Field Photography with a Hand-held Plenoptic Camera", Stanford Tech Report CTSR Feb. 2005, pp. 1-11.

(Continued)

*Primary Examiner* — John Villecco
(74) *Attorney, Agent, or Firm* — Rossi, Kimms & McDowell LLP

(57) ABSTRACT

An image pickup apparatus includes an imaging optical system, an image pickup element that includes a plurality of pixels, a lens array configured so that a ray from the same position on an object plane enters the pixels different from each other of the image pickup element in accordance with a pupil region of the imaging optical system through which the ray passes, and a controller configured to change an interval between the lens array and the image pickup element in accordance with a variation of a pupil of the imaging optical system.

12 Claims, 23 Drawing Sheets

(56) References Cited

U.S. PATENT DOCUMENTS

| | | |
|---|---|---|
| 2010/0026852 A1* | 2/2010 | Ng et al. .................. 348/239 |
| 2010/0066812 A1* | 3/2010 | Kajihara et al. ............ 348/46 |
| 2012/0300097 A1* | 11/2012 | Ng et al. ................ 348/222.1 |
| 2013/0044256 A1* | 2/2013 | Hiasa et al. ............... 348/360 |
| 2013/0076931 A1* | 3/2013 | Border et al. ........... 348/222.1 |
| 2013/0083233 A1* | 4/2013 | Fukami ..................... 348/360 |
| 2013/0113981 A1* | 5/2013 | Knight et al. ............. 348/345 |
| 2013/0222606 A1* | 8/2013 | Pitts et al. ................. 348/187 |
| 2013/0308035 A1* | 11/2013 | Hiasa et al. ............... 348/340 |
| 2014/0049663 A1* | 2/2014 | Ng et al. ................ 348/222.1 |

OTHER PUBLICATIONS

Andrew Lumsdaine, et al., "Full Resolution Lightfield Rendering", Adobe Technical Report, Jan. 2008, Adobe Systems, Inc., pp. 1-12.

Office Action issued in Corresponding Japanese Patent Application No. 2011-185403, dated Jun. 24, 2014.

\* cited by examiner

US 8,836,844 B2

IMAGE PICKUP APPARATUS FOR OBTAINING LIGHT FIELD

BACKGROUND OF THE INVENTION

1. Field of the Invention

The present invention relates to an image pickup apparatus that obtains a two-dimensional light intensity distribution and angle information of a ray in an object space.

2. Description of the Related Art

Recently, an image pickup apparatus that performs a calculation using data obtained by an image pickup element and performs a corresponding digital image processing so as to output various images is proposed. Ren Ng, et al., "Light Field Photography with a Hand-held Plenoptic Camera", Stanford Tech Report CTSR 2005-2, and Andrew Lumsdaine, et al., "Full Resolution Light Field Rendering", Adobe Technical Report, January 2008, disclose an image pickup apparatus that obtains the two-dimensional light intensity distribution and the angle information of the ray in the object space at the same time using "Light Field Photography". The two-dimensional light intensity distribution and the angle information of the ray are collectively referred to as a light field, and three-dimensional information in the object space can be obtained by obtaining the light field. According to such an image pickup apparatus, the light field is obtained and an image processing is performed after taking an image so that a change of a focus position of the image which is called a refocus, a shot point of view, a depth of field, or the like can be performed.

Japanese Patent No. 4264569 discloses an image pickup apparatus that switches positions of a lens array in the configuration that is disclosed in Ren Ng, et al., "Light Field Photography with a Hand-held Plenoptic Camera", Stanford Tech Report CTSR 2005-2 so that operations of taking a common image and obtaining the light field can be switched.

However, a harmful effect of a case where a position or a size of an exit pupil of an imaging optical system is changed and a measure for the harmful effect are not disclosed in Ren Ng, et al., "Light Field Photography with a Hand-held Plenoptic Camera", Stanford Tech Report CTSR 2005-2, and Andrew Lumsdaine, et al., "Full Resolution Light Field Rendering", Adobe Technical Report, January 2008. The exit pupil of the imaging optical system is changed by varying the magnification or focusing of the imaging optical system, or narrowing an aperture. When the exit pupil of the imaging optical system is changed, a light beam corresponding to a certain position on an object plane does not enter an appropriate region on an image pickup element. Therefore, the number of pixels which a ray does not enter, called a dead zone, are increased, and a phenomenon in which rays that have different positions and angles enter the same pixel on the object plane, called crosstalk, is generated. In addition, a sampling pitch related to angle information of the ray that is an angle component of a light field is increased. In this case, an image that is generated by the reconstruction described above is limited. For example, a refocus is performed by moving a focus position back and forth with reference to a focused object plane as an axis at the time of taking an image, and a movable range is decreased when the sampling pitch of the angle component of the light field is increased.

Japanese Patent No. 4264569 discloses an image pickup apparatus capable of varying a position of a lens array so as to obtain the light field. However, it is performed to switch a common operation of taking an image and an operation of obtaining the light field. It discloses neither the harmful effect of the case where the position or the size of the exit pupil of the imaging optical system is changed nor the measurement for the harmful effect. In addition, a way to the change of the interval between the lens array and the image pickup element and the variation of the exit pupil are not correlated to each other.

SUMMARY OF THE INVENTION

The present invention provides an image pickup apparatus that reduces the decrease of an amount of information and the deterioration of accuracy of the light field when a position or a size of a pupil of an imaging optical system is changed.

An image pickup apparatus as one aspect of the present invention includes an imaging optical system, an image pickup element that includes a plurality of pixels, a lens array configured so that a ray from the same position on an object plane enters the pixels different from each other of the image pickup element in accordance with a pupil region of the imaging optical system through which the ray passes, and a controller configured to change an interval between the lens array and the image pickup element in accordance with a variation of a pupil of the imaging optical system.

Further features and aspects of the present invention will become apparent from the following description of exemplary embodiments with reference to the attached drawings.

DESCRIPTION OF THE PREFERRED EMBODIMENTS

Figure 1:
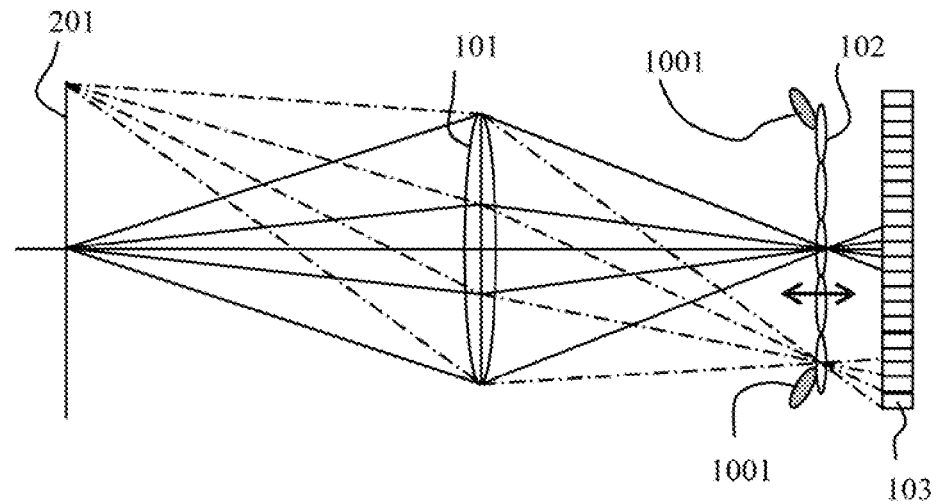
FIG. 1 is a schematic configuration diagram of an image pickup optical system in each of Embodiments 1 to 3.

Exemplary embodiments of the present invention will be described below with reference to the accompanied drawings. In each of the drawings, the same elements will be denoted by the same reference numerals and the duplicate descriptions thereof will be omitted.

Each embodiment is directed to an image pickup apparatus that obtains a light field, which reduces an influence on the decrease of amount (amount of information) and accuracy of the light field that are caused by variation of a pupil of the imaging optical system (change of a position or a size of the pupil).

Embodiment 1

Figure 4:
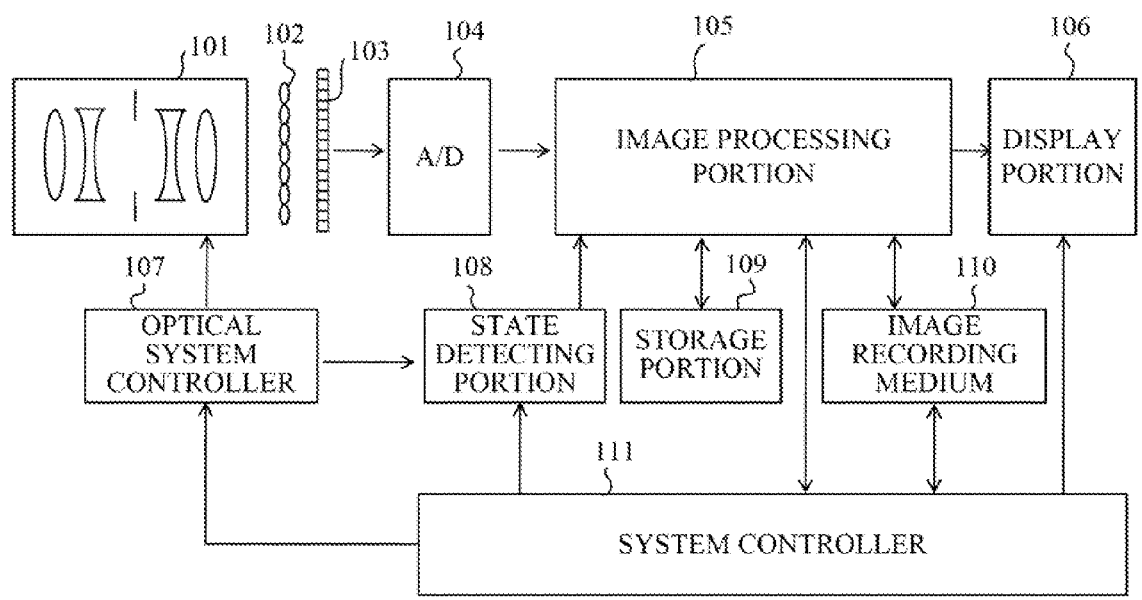
FIG. 4 is a block diagram of an image pickup apparatus in each of Embodiments 1, 2, 4, and 5.

First of all, referring to FIG. 4, a configuration of an image pickup apparatus in Embodiment 1 of the present invention will be described. FIG. 4 is a block diagram of the image pickup apparatus in the present embodiment. A ray from an object space (not shown) is received by an image pickup element 103 that includes a plurality of pixels via an imaging optical system 101 and a lens array 102 configured by including a plurality of small lenses. An image pickup optical system is configured by the imaging optical system 101, the lens array 102, and the image pickup element 103.

An image pickup element 103 is a two-dimensional image pickup element such as a CCD (Charge Coupled Device) or a CMOS (Complementary Metal-Oxide Semiconductor), which includes a plurality of pixels. An energy of a ray that enters the image pickup element 103 via an imaging optical system 101 configured by including a main lens unit and a lens array 102 is converted to an electric signal (an analog signal), and then the analog signal is converted to a digital signal by an A/D converter 104. A predetermined processing is performed for this digital signal by the image processing portion 105, and then it is stored in a predetermined format in an image recording medium 110 such as a semiconductor memory. In this case, image pickup condition information of the image pickup apparatus that is obtained from a state detecting portion 108 is also stored at the same time. The image pickup condition information means an object distance, an aperture, a focal length of a zoom lens, or the like. The state detecting portion 108 may directly obtain the image pickup condition information from a system controller 111, and with respect to information related to the image pickup optical system, the state detecting portion 108 can also obtain it from an optical system controller 107.

When the image stored in the image recording medium 110 is displayed on a display portion 106, a reconstruction processing is performed by the image processing portion 105 based on the image pickup condition information. As a result, an image reconstructed so as to be desired point of view, focus position, or depth of field is displayed on the display portion 106. In order to perform a high speed operation, a desired image setting (a point of view, focusing, a depth of field, or the like) may also be previously stored in a storage portion 109 so that a reconstructed image is directly displayed on the display portion 106 without involving the image recording medium 110. Furthermore, the image recorded in the image recording medium 110 may also be the reconstructed image. Series of the controls described above are performed by the system controller 111, and a mechanical drive of the image pickup optical system is performed by the image pickup optical system controller 107 based on an instruction of the system controller 111.

Next, the decrease of the amount of the information of the obtained light field and the deterioration of the accuracy of the obtained light field that are caused by the variation of the pupil of the imaging optical system 101 are described, and subsequently the change of an interval between the lens array 102 and the image pickup element 103 to prevent the decrease of the amount of the information and the deterioration of the accuracy is described. For easy understanding, the followings are described for a case of a one-dimensional system. However, a similar theory is applied to a two-dimensional system.

Figure 6A:
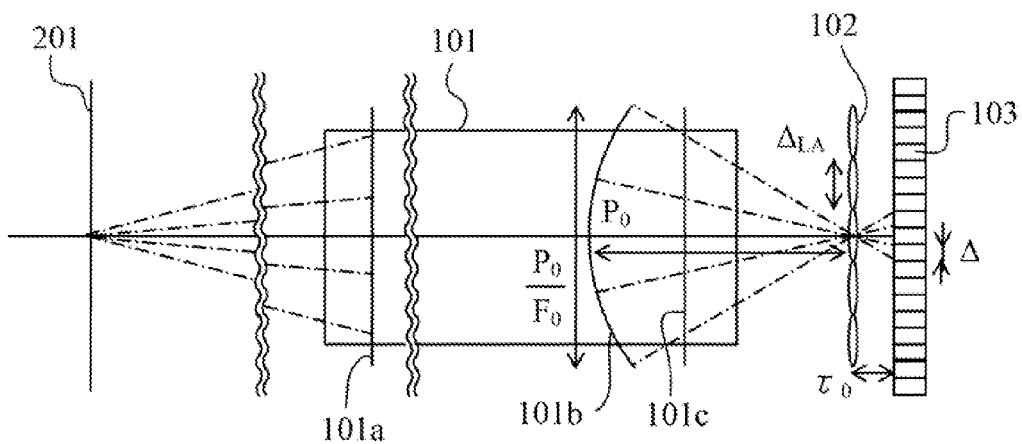
FIGS. 6A to 6C are diagrams of the image pickup optical system in each of Embodiments 1 to 3.
Figure 6B:
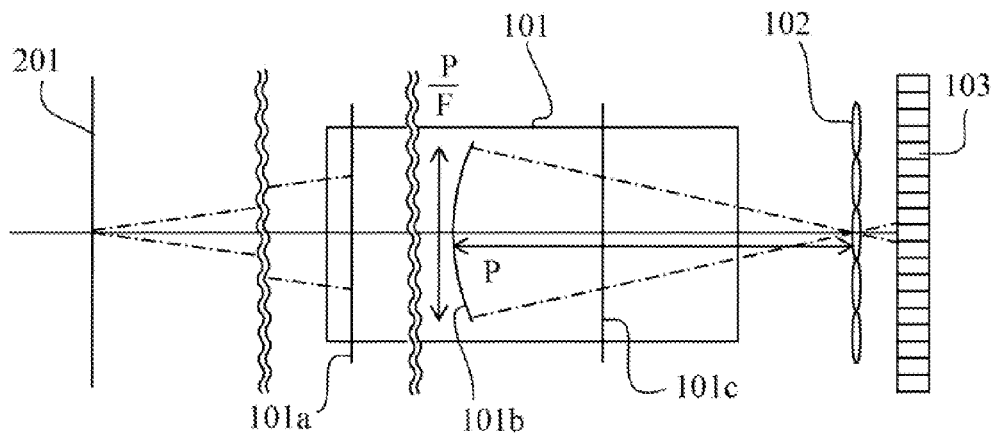
Figure 6C:
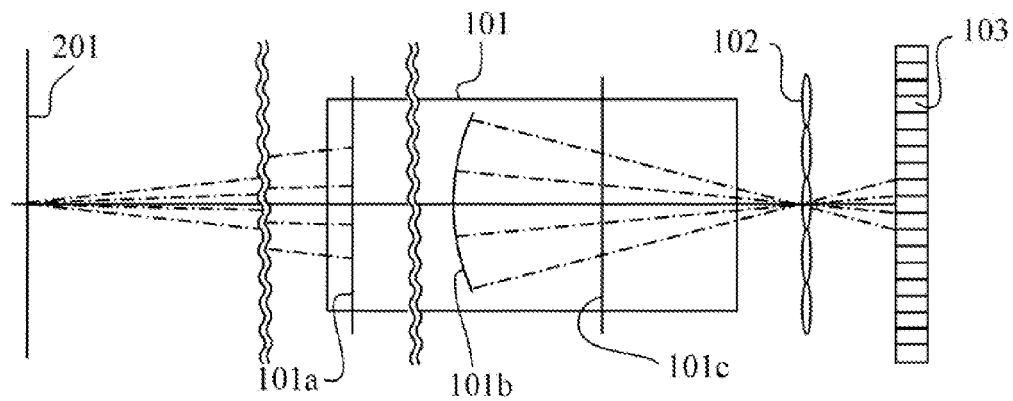

First of all, the decrease of the amount of the information of the obtained light field and the deterioration of the accuracy of the obtained light field that are caused by the variation of the pupil of the imaging optical system are described. FIG. 1 is a schematic configuration diagram of the image pickup optical system in the present embodiment. FIGS. 6A to 6C are diagrams in which an object side principal plane 101a, an exit pupil plane 101b, and an image side principal plane 101c are added to the imaging optical system 101 of FIG. 1. As illustrated in FIGS. 1 and 6A, the lens array 102 is disposed on a conjugate plane of the imaging optical system 101 with respect to an object plane 201 (an image side conjugate plane). In this case, the lens array 102 is configured so that the image pickup element 103 and the exit pupil plane 101b have a substantially conjugate relationship. In such a configuration of the lens array 102, the ray from the same position of the object plane 201 enters pixels of the image pickup element 103 that are different from each other in accordance with a pupil region of the imaging optical system 101 through which the ray passes. Therefore, according to the image pickup apparatus of the present embodiment, the light field can be obtained. In FIG. 6A, a region of the image pickup element 103 which the ray passing through the small lens that is positioned near an optical axis of the lens array 102 enters has substantially the same as a pitch of the lens array 102. The small lens indicates one of the lenses that constitute the lens array 102. When the region is smaller than the pitch of the lens array 102, a dead zone in which any information cannot be obtained is generated and the pixels are wasted.

Figures 5A, 5B:
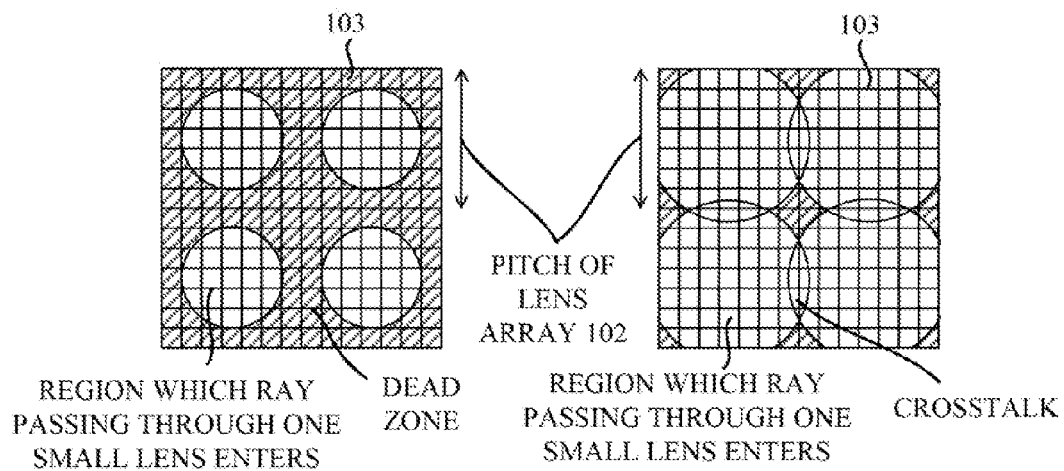
FIGS. 5A and 5B are diagrams of describing an image that is formed on an image pickup element in each of the embodiments.

FIGS. 5A and 5B are diagrams of illustrating two-dimensional dead zones that are generated on the image pickup element 103. White circle in FIG. 5A indicates a region where a ray that passes through the imaging optical system 101 and one small lens of the lens array 102 enters on the image pickup element 103. The other region indicated by diagonal lines is the dead zone which a ray does not enter. On the other hand, when the region is larger than the pitch of the lens array 102, a crosstalk in which rays passing through adjacent small lenses of the lens array 102 are mixed is generated, and therefore a correct light field cannot be obtained. In FIG. 5B, portions in which white circles are overlapped indicate the crosstalk.

Thus, FIG. 6A indicates a state in which a correct light field can be efficiently obtained without wasting the pixel. FIG. 6B illustrates a case where the exit pupil (the exit pupil plane 101b) of the imaging optical system 101 is changed (a case where the variation of the pupil is generated) from the state of FIG. 6A. The variation of the pupil specifically means the change of a position or a size of the pupil (the exit pupil) that is caused by varying the magnification or performing the focusing of the imaging optical system 101, narrowing the aperture, or the like. As illustrated in FIG. 6B, since the exit pupil plane 101b becomes small and is also moved to the object side, the division number of a light beam from the same position on the object plane 201 is reduced. In FIG. 6B, the division number of the pupil is 1, and therefore an angle component of the light field cannot be obtained. Accordingly, the dead zone on the image pickup element 103 increases. On the contrary, when the exit pupil plane 101b is enlarged or the exit pupil plane 101b is moved to the image side, the crosstalk is generated and therefore the correct light field cannot be obtained.

Next, an influence on an image reconstruction that is caused by the decrease of the amount of the light field (the amount of the obtained information) and the deterioration of the accuracy of the light field will be described as an example of refocus. The detail of the refocus is described in "Fourier Slice Photography" (Ren Ng, 2005, ACM Trans. Graph. 24, 735-744), and therefore it will be easily described in the present embodiment. A refocus range is determined by a sampling pitch $\Delta x$ of a spatial component that represents a two-dimensional light intensity distribution in an object space and a sampling pitch $\Delta u$ of an angle component that represents angle information of a ray, and its coefficient $\alpha_\pm$ is given by the following Expression (1).

$$\alpha_\pm = \frac{1}{1 \pm \Delta x/\Delta u} \quad (1)$$

Figure 7:
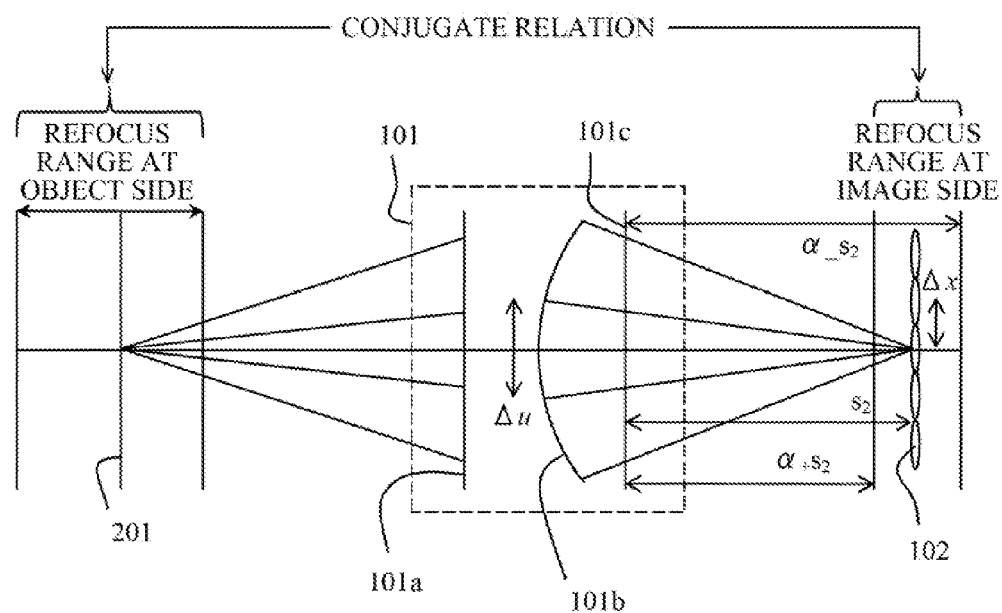
FIG. 7 is a diagram of a refocus range in each of Embodiments 1 to 3.

In Expression (1), symbol $\Delta x$ denotes a sampling pitch on the image side conjugate plane 202 of the imaging optical system 101 with respect to the object plane 201, and symbol $\Delta u$ denotes a sampling pitch on the exit pupil plane 101b of the imaging optical system 101. FIG. 7 is a diagram of describing $\alpha_\pm$, $\Delta x$, $\Delta u$, and the refocus range in the present embodiment. In the present embodiment, the sampling pitch $\Delta x$ is equal to the pitch of the lens array 102. A range that is conjugate to the refocus range $\alpha_+ s_2 \sim \alpha_- s_2$ at the image side represented by using Expression (1) via the imaging optical system 101 is a refocus range at the object side. Symbol $s_2$ denotes an interval between the image side principal plane 101c of the imaging optical system 101 and the image side conjugate plane of the imaging optical system 101 with respect to the object plane 201.

Figure 8A:
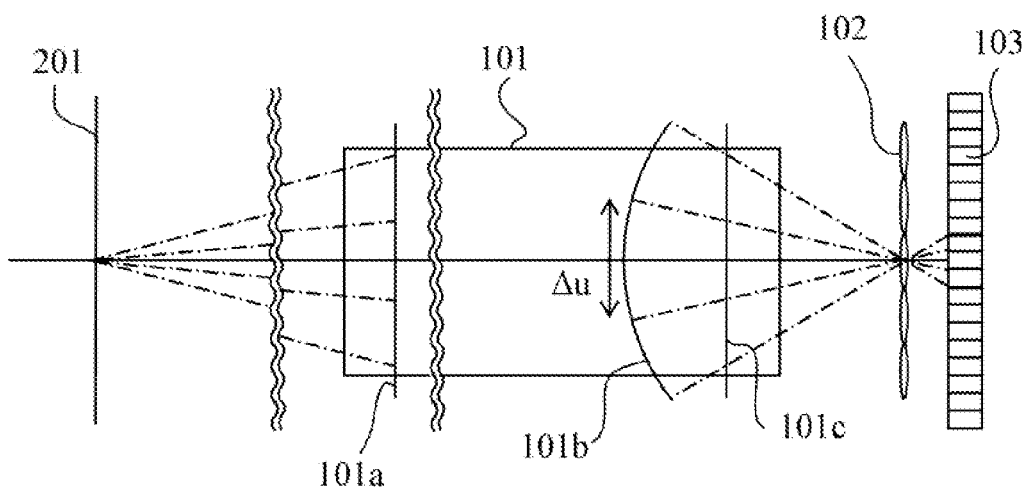
FIGS. 8A to 8C are diagrams of illustrating an influence of variation of a pupil of the image pickup optical system in each of Embodiments 1 to 3.
Figure 8B:
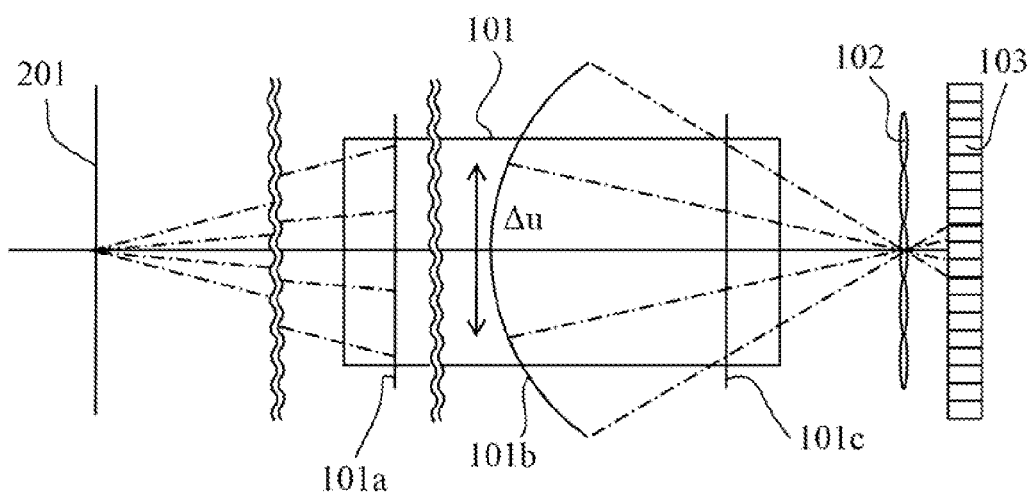
Figure 8C:
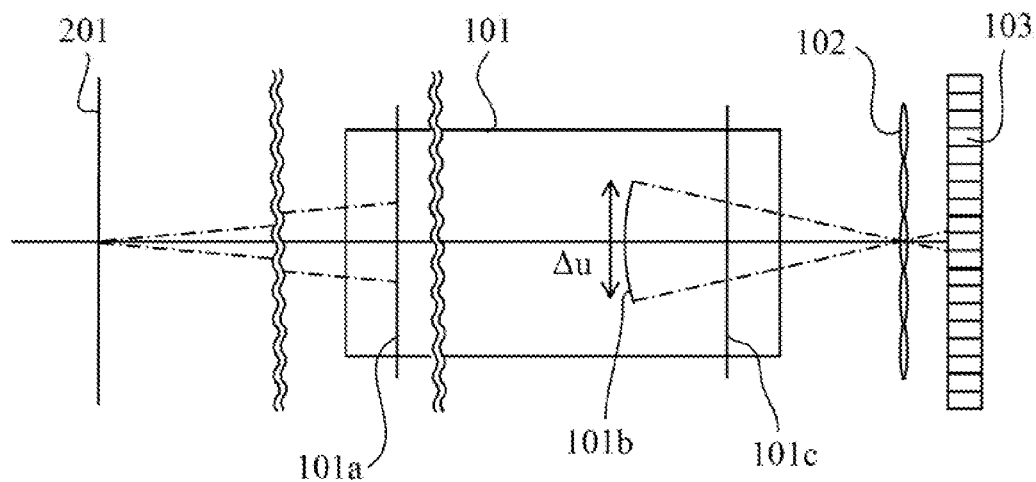

Next, referring to FIGS. 8A to 8C, the influence of the variation of the pupil of the imaging optical system 101 will be described. For easy understanding, the description is divided into a case where the F number of the imaging optical system 101 is constant and the exit pupil position is changed and a case where the exit pupil position is constant and the F number is changed. FIGS. 8A and 8B illustrate the case where the F number of the imaging optical system 101 is constant and the exit pupil position is varied, and FIGS. 8A and 8C illustrate the case where the exit pupil position of the imaging optical system 101 is constant and the F number is varied.

First of all, the influence of the case where the F number of the imaging optical system 101 is constant and the exit pupil position is varied will be described. As the change of the state of FIG. 8A to the state of FIG. 8B, when the F number is constant and the exit pupil is moved to the object side, the accuracy of the obtained light field is deteriorated. In other words, a value of the sampling pitch $\Delta u$ on the exit pupil plane 101b is increased. Therefore, the coefficient $\alpha_\pm$ that is represented by Expression (1) is close to 1 and the refocus range is narrowed. On the contrary, when the exit pupil is moved to the image side from the state illustrated in FIG. 8A, the value of the sampling pitch $\Delta u$ is decreased. Therefore, the coefficient $\alpha_\pm$ departs from 1 and the refocus range is increased. Thus, the variation of the exit pupil position (the position of the exit pupil plane 101b) of the imaging optical system 101 causes the variation of the refocus range. Similarly, with regard to the change of a point of view or the adjustment of the depth of field other than the refocus, its degree of freedom increases as the sampling pitch $\Delta$ is decreased, i.e. the sampling pitch of the light field is reduced. Accordingly, when the pupil of the imaging optical system 101 is varied, the sampling pitch $\Delta u$ needs to be reduced.

Next, the influence which is caused by the change of the F number of the imaging optical system 101 will be considered. In conclusion, when the F number of the imaging optical system 101 is increased (the size of the pupil is reduced), the dead zone is increased on the image pickup element 103. On the other hand, when the F number of the imaging optical system 101 is decreased (the size of the pupil is enlarged), the crosstalk is generated. For example, when the F number of the imaging optical system 101 is three times as large as that in the state of FIG. 8A, the state is changed to the state of FIG. 8C. While the number of pixels which the light enters for one small lens is three in FIG. 8A, the number of a light receiving pixel is only one and the two remaining pixels are the dead zone in FIG. 8C.

On the contrary, when the F number is reduced, the ray which passes through the small lens is mixed with the ray which passes through the adjacent small lens, and therefore the crosstalk is generated. In this case, when the pixel where the crosstalk is generated is used for the reconstruction, an image cannot be correctly formed. Therefore, in order to output a correct image, it is necessary to only use the pixel where the crosstalk is not generated for the reconstruction processing. Accordingly, when the dead zone or the crosstalk is generated, a non-use pixel is generated and the obtainment of the information is inefficient. Furthermore, in this case, an amount of obtainable information is decreased although the sampling pitch of the light field does not change. This is apparent if FIG. 8A is compared to FIG. 8C.

In the above discussion, problems that are caused by the variation of the pupil of the imaging optical system 101 in the image pickup optical system that obtains the light field have been apparent. The sampling pitch of the light field becomes coarse when the exit pupil position is moved to the object side, and the efficiency of obtaining the light field and the amount of the information are decreased when the F number is changed. In the above description, although the movement of the exit pupil position and the change of the F number are treated independently of each other, actually the two phenomena may occur in a complex form. In order to solve these problems, the interval (the distance) between the lens array 102 and the image pickup element 103 is changed in accordance with the variation of the pupil (the position or the size of the pupil). This interval is controlled by the system controller 111 (a controller) in FIG. 4. More specifically, the system controller 111 controls a drive portion 1001 described below so that the drive portion 1001 moves the lens array 102 or the image pickup element 103 (or both of them). Changing the interval between the lens array 102 and the image pickup element 103, the decreases of the amount and the accuracy of the obtained light field are reduced, and therefore the above problems can be overcome.

FIG. 6C is a diagram of illustrating a state in which the interval between the lens array 102 and the image pickup element 103 is changed in accordance with the variation of the pupil of FIG. 6B so that the sampling pitch Δu is decreased. The dead zone is increased in accordance with the increase of the F number of the imaging optical system 101, but a ray can enter the dead zone by increasing the interval between the lens array 102 and the image pickup element 103. As a result, the division number of the pupil is increased, and therefore the decrease of the amount of the obtained light field and the deterioration of the accuracy of the obtained light field can be reduced. In FIG. 6C, the interval between the lens array 102 and the image pickup element 103 is changed by moving the lens array 102, but the present embodiment is not limited to this. Alternatively, the image pickup element 103 may be moved while the lens array 102 is fixed, or both the lens array 102 and the image pickup element 103 may be moved so as to change the interval.

Commonly, in a zoom lens, the exit pupil plane is positioned at the side closest to the image side at a wide-angle end, and the exit pupil is moved to the object side when the focal length is increased in many times. Therefore, as the focal length is increased, the sampling pitch of the light field becomes coarse and the decrease of the refocus range or the like easily occurs. On the other hand, commonly, in the zoom lens, the F number is minimized at the wide-angle end and the F number increases as the focal length is increased in the full-open state of the aperture in many cases. In short, as it comes close to a telephoto end with reference to the wide-angle end, the sampling pitch Δu is increased and the dead zone is enlarged. Therefore, changing the interval between the lens array 102 and the image pickup element 103 in accordance with the variation of the pupil during the change from the wide-angle end to the telephoto end, the dead zone can be reduced and also the sampling pitch Δu can be decreased. However, when the size of the aperture does not change at the time of performing the magnification varying operation and the focusing operation and the aperture and a lens unit which is disposed at the image side relative to the aperture do not move, the exit pupil does not change even if the focal length is changed. In this case, a light receiving region of the image pickup element 103 does not change even when the interval between the lens array 102 and the image pickup element 103 is not changed and the light field can be always obtained at a constant sampling pitch Δu. However, the interval between the lens array 102 and the image pickup element 103 may also be changed in a state of a specific focal length so that the sampling pitch Δu is only changed in this time.

Next, in the present embodiment, a way of changing the interval between the lens array 102 and the image pickup element 103 will be described in detail. The intervals between the lens array 102 and the image pickup element 103 in a first state and a second state of the imaging optical system 101 are referred to as a first interval and a second interval, respectively. When the F number of the imaging optical system 101 in the second state is larger than that in the first state or the exit pupil position in the second state is closer to the object side than that in the first state, the second interval may be set to be larger than the first interval. According to such controls, the generation of the dead zone is reduced and also the sampling pitch of the light field can be decreased.

The increase of the F number of the imaging optical system 101 causes the increase of the dead zone and the decrease of the amount of information of the light field. On conditions that the exit pupil position of the imaging optical system 101 is constant, the interval between the lens array 102 and the image pickup element 103 in the imaging optical system 101 having a first F number and a second F number are referred to as a first interval and a second interval, respectively. When the second F number is larger than the first F number, the second interval may be set to be larger than the first interval. In other words, on conditions that the position of the exit pupil of the imaging optical system 101 is constant, with regard to the interval between the lens array 102 and the image pickup element 103, the second interval of the case in which the imaging optical system 101 has the second F number larger than the first F number is set to be larger than the first interval of the case in which the imaging optical system 101 has the first F number. According to such controls, the decrease of the amount of the obtained light field caused by the variation of the pupil can be reduced as illustrated in FIGS. 6A and 6C.

Furthermore, as the exit pupil position of the imaging optical system 101 comes close to the object side, the sampling pitch Δu is increased and the sampling pitch of the light field is increased. When the F number of the imaging optical system 101 is constant, the intervals between the lens array 102 and the image pickup element 103 on conditions that the exit pupil position of the imaging optical system 101 is located at a first position and a second position are referred to as a first interval and a second interval, respectively. When the second position is located at the object side relative to the first position, the second interval may be set to be larger than the first interval. In other words, when the F number is constant, the interval between the lens array 102 and the image pickup element 103 is set so that the second interval of the case where the position of the exit pupil of the imaging optical system 101 is located at the second position that is at the object side relative to the first position is larger than the first interval of the case where the position of the exit pupil is located at the first position. According to such controls, as illustrated in FIGS. 6A and 6C, the deterioration of the accuracy of the obtained light field can be reduced.

For easy understanding, the embodiment has described the case in which the variation of the pupil of the imaging optical system 101 is divided into the movement of the exit pupil position and the change of the F number on conditions that any one of them is fixed. A general variation of the pupil can be represented by combining the two cases. For example, it is assumed that there is a zoom lens in which the F number is increased and the exit pupil position is moved to the object side during varying the magnification from the wide-angle end to the telephoto end. This case can also be considered that, first of all, the aperture is narrowed at the wide-angle end so as to be equal to the F number at the telephoto end, and then varying the magnification to the telephoto end is performed while the F number is kept.

Furthermore, it is preferred that the interval between the lens array 102 and the image pickup element 103 be changed as follows. In other words, when the exit pupil of the imaging optical system 101 is moved to the object side, the interval is changed so that a value $\Delta x/\Delta u$ that is obtained by dividing the sampling pitch related to the spatial component by the sampling pitch related to the angle component of the light field is increased. In the present embodiment, the sampling pitch $\Delta x$ is equal to the pitch of the lens array 102. Therefore, when the exit pupil of the imaging optical system 101 is moved to the object side, it is preferred that the interval between the lens array 102 and the image pickup element 103 be changed so as to increase a value that is obtained by dividing the pitch of the lens array 102 by the sampling pitch at the exit pupil of the imaging optical system 101. As a result, the degree of freedom of the image that is generated by the reconstruction such as a refocus range represented by Expression (1) is increased.

Figure 9:
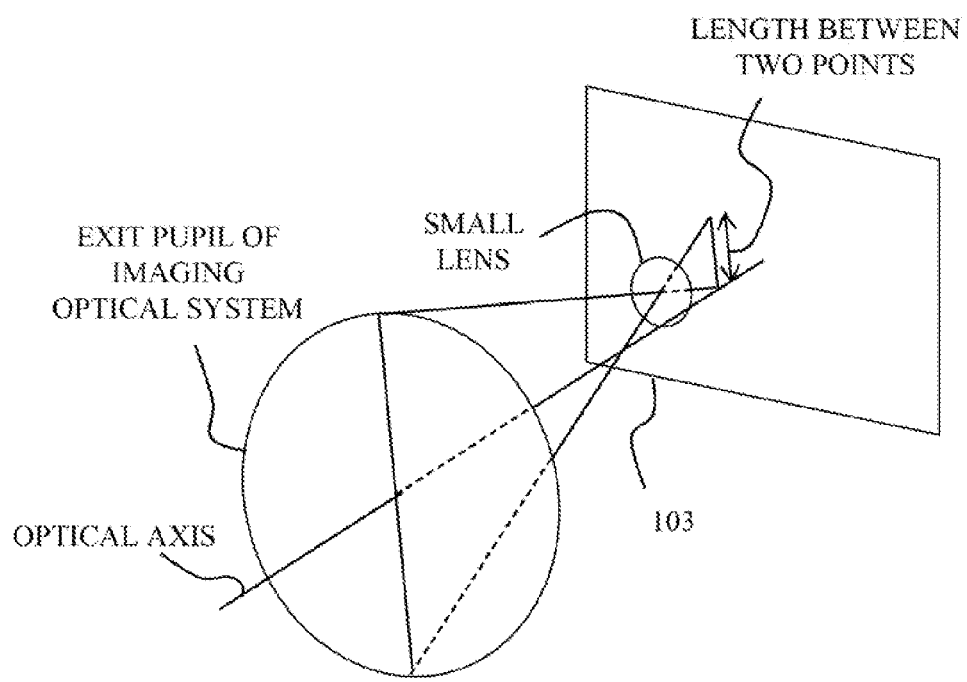
FIG. 9 is a diagram of illustrating the change of an interval between the lens array and the image pickup element of the image pickup optical system in each of the embodiments.

In the embodiment, two straight lines that connect both ends of the exit pupil with a center of the small lens that is positioned near the optical axis of the lens array 102 in a cross section of an azimuth direction when the exit pupil of the imaging optical system 101 varies is considered. It is preferred that the interval between the lens array 102 and the image pickup element 103 be changed so that a length between two points at which the two straight lines intersects with the image pickup element 103 is not more than the pitch of the lens array 102. FIG. 9 is a diagram of illustrating a relationship between the exit pupil of the imaging optical system 101 and the length between the small lens of the lens array 102 and the two points. If the length between the two points illustrated in FIG. 9 exceeds the pitch of the lens array 102, the crosstalk is generated. Therefore, changing the length between the two points so as to be not more than the pitch of the lens array 102, the generation of the crosstalk is avoided and the decrease of the amount of the obtained light field can be reduced. More preferably, the interval between the lens array 102 and the image pickup element 103 is changed so that the length between the two points at which the two straight lines intersect with the image pickup element 103 comes close to the pitch of the lens array 102. As a result, the crosstalk can be avoided and the light field can also be obtained using the dead zone maximally.

In the embodiment, a case in which the lens array 102 is moved so as to change the interval between the lens array 102 and the image pickup element 103 is considered. When the lens array 102 moves in accordance with the variation of the pupil of the imaging optical system 101, it is preferred that a plane conjugate to the lens array 102 via the imaging optical system 101 be moved in a direction opposite to a moving direction of the lens array 102. This movement is performed by a focusing portion that is provided in the imaging optical system 101 for example. This relates to a point in which any plane at the object side is set to be an axis so as to move a focus position when considering the refocus in the configuration of FIG. 1.

Figure 10A:
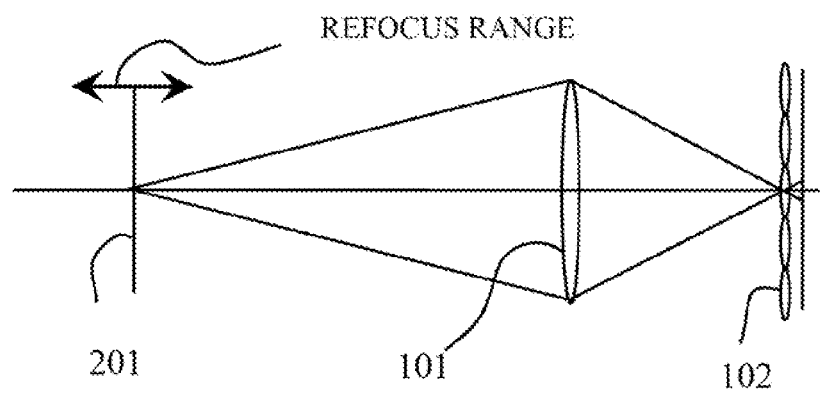
FIGS. 10A to 10C are diagrams of illustrating the magnification of the refocus range in each of Embodiments 1 to 3.
Figure 10B:
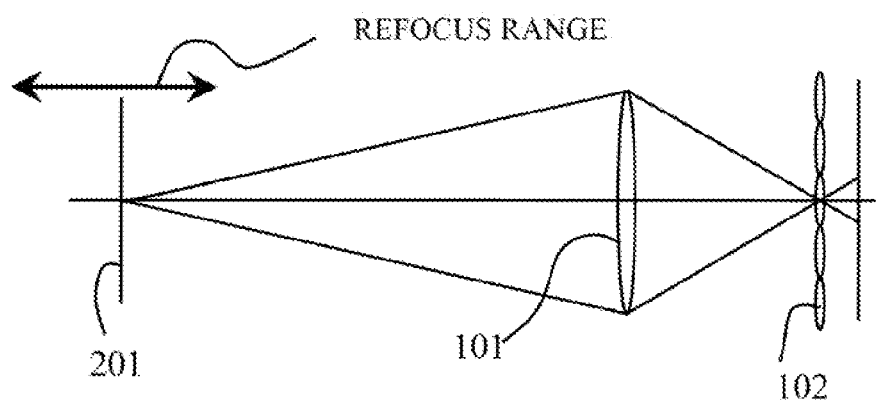
Figure 10C:
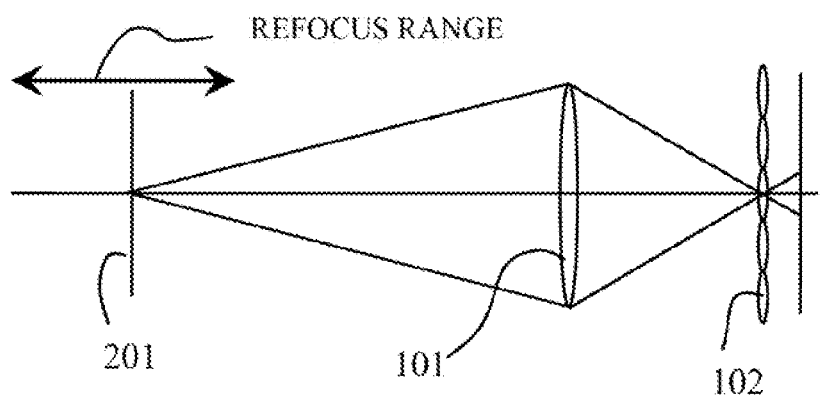

Referring to FIGS. 10A to 10C, the above effect in the configuration of FIG. 1 will be described. In FIGS. 10A to 10C, the image pickup element 103 is fixed and the lens array 102 is only moved so as to change a distance between the lens array 102 and the image pickup element 103. However, if the lens array 102 is moved, the discussion similar to the following discussion can be applied even when the image pickup element 103 is moved. FIG. 10A illustrates the refocus range before the lens array 102 is moved. FIG. 10B illustrates the refocus range when only the lens array 102 is simply moved. FIG. 10C illustrates the refocus range in a case where a conjugate plane of the lens array 102 with respect to the imaging optical system 101 is moved in a direction opposite to a moving direction of the lens array 102 after the lens array 102 is moved.

When the conjugate plane is not moved after the lens array 102 is moved, as illustrated in FIGS. 10A and 10B, the focus position at the object side changes before and after the lens array 102 is moved. In this case, the refocus range is expanded to both sides with reference to the focus position at the time of taking an image. Therefore, in accordance with an amount of the movement of the lens array 102, as illustrated in FIGS. 10A and 10B, there is a case in which the refocus range at a side of the image pickup apparatus after the movement is narrowed compared to a case before the movement. In order to avoid this, it is preferred that a focus unit of the imaging optical system 101 be moved at the time of moving the lens array 102 so as to move the conjugate plane. In the configuration of FIG. 1, the conjugate plane is moved in the direction opposite to the moving direction of the lens array 102 so that the refocus range can be extended to both the sides as illustrated in FIGS. 10A and 10C. On the other hand, when the image pickup element 103 is moved while the lens array 102 is fixed, the refocus range is always expanded to both the sides without adjusting the focus of the imaging optical system 101.

It is preferred that the lens array 102 be configured by small lenses each having a surface with a convex shape at the image side. As a result, the astigmatism of the small lens is reduced and the depth is deepened. The interval between the lens array 102 and the image pickup element 103 described above needs to be changed with keeping the imaging relationship of the small lens. In the case of FIG. 1, the exit pupil plane 101b of the imaging optical system 101 and the image pickup element 103 have a conjugate relationship with respect to the small lens. Deepening the depth of the small lens, the interval between the lens array 102 and the image pickup element 103 can be easily changed with keeping this conjugate relationship. More preferably, the lens array 102 is configured by the small lenses each having a surface with a planar shape or a convex shape at the object side. As a result, the radius of the small lens is gentle and the aberration is reduced, and also the imaging relationship is easily kept.

Figure 11:
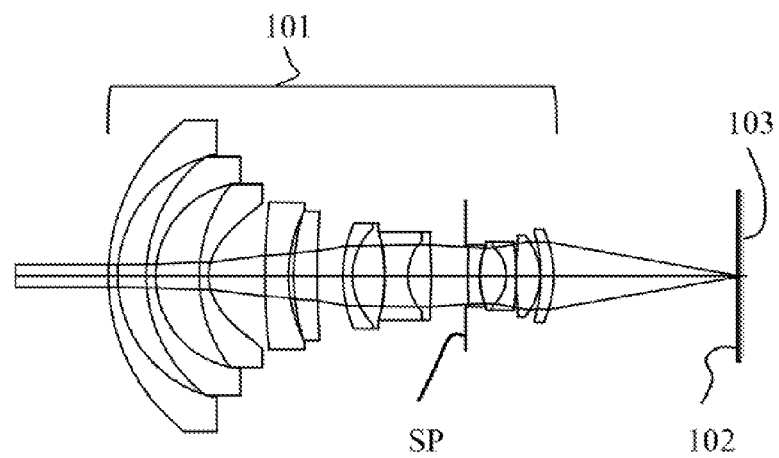
FIG. 11 is a cross-sectional diagram of the image pickup optical system in Embodiment 1.

FIG. 11 is a cross-sectional diagram of the image pickup optical system in the present embodiment. The imaging optical system 101 of FIG. 11 is a single focus lens. The lens array 102 is configured by the small lenses each having a positive refractive power. The small lens is configured by a spherical solid lens that has both surfaces each having a convex shape, but any one of the surfaces at both sides may also be a plane or alternatively it may be an aspherical curved shape. The lens array 102 may also be configured by arraying a liquid lens, a liquid crystal lens, a diffractive optical element, or the like.

Figure 12A:
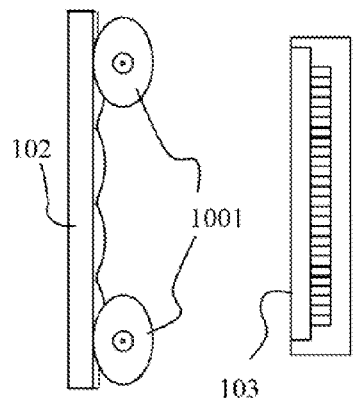
FIGS. 12A to 12D are diagrams of illustrating drive portions of the lens array and the image pickup element in each of Embodiments 1 to 6.
Figure 12B:
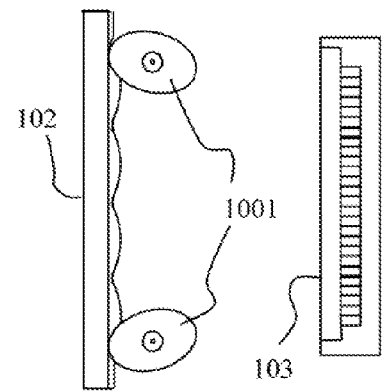
Figure 12C:
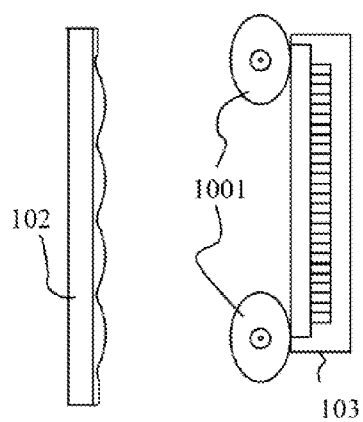
Figure 12D:
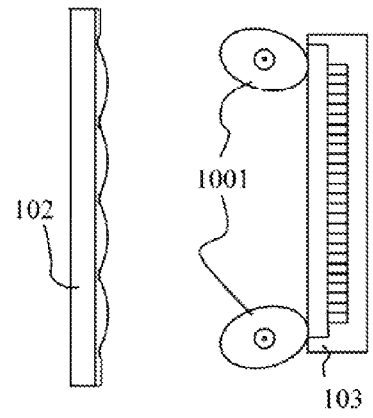

The interval between the lens array 102 and the image pickup element 103 is changed in accordance with the changes of the focusing of the imaging optical system 101 and the F number. FIGS. 12A to 12D illustrate a drive portion 1001 that changes the interval between the lens array 102 and the image pickup element 103. The drive portion 1001 is, for example configured as illustrated in FIGS. 12A and 12B. A disk is in contact with each of at least three regions at an edge portion of the lens array 102, and the lens array 102 can be driven by rotating the disk as illustrated in FIGS. 12A and 12B. In the present embodiment, the interval between the lens array 102 and the image pickup element 103 is changed while the lens array 102 is driven, but the image pickup element 103 may also be driven (moved) as illustrated in FIGS. 12C and 12D. It may also be configured so that both the lens array 102 and the image pickup element 103 are moved.

In order to avoid the crosstalk, it is necessary that the size of the image of the exit pupil of the imaging optical system 101 that is formed on the image pickup element 103 by the small lens of the lens array 102 located near the optical axis does not exceed the size of the small lens. Preferably, the distance between the lens array 102 and the image pickup element 103 is changed so that the size of the image of the exit pupil is almost the same as the size of the small lens. As a result, maximizing the use of the dead zone, the sampling pitch of the angle component of the light field can be decreased.

The interval between the lens array 102 and the image pickup element 103 may also be changed so as to meet the following Expression (2).

$$0.4 < \frac{\tau}{F\Delta_{LA}} < 1.2 \quad \left(F \leq F_0 \frac{\Delta_{LA}+\Delta}{\Delta_{LA}-\Delta}\right) \\ 0.4 < \frac{\tau}{F_0\Delta_{LA}} \frac{\Delta_{LA}-\Delta}{\Delta_{LA}+\Delta} < 1.2 \quad \left(F > F_0 \frac{\Delta_{LA}+\Delta}{\Delta_{LA}-\Delta}\right) \tag{2}$$

In Expression (2), symbol $F_0$ denotes a minimum value of the F number which can be obtained by the imaging optical system 101, symbol F denotes the F number of the imaging optical system 101 in an arbitrary state, symbol $\Delta$ denotes a pixel pitch of the image pickup element 103, and $\Delta_{LA}$ denotes a pitch of the lens array 102. Symbol $\tau$ denotes an interval between the image side principal plane of the lens array 102 and the image pickup element 103 when the F number of the imaging optical system 101 is F. The relationship of each symbol is illustrated in FIGS. 6A and 6C.

Subsequently, Expression (2) is described. Expression (2) is an expression in which the interval between the lens array 102 and the image pickup element 103 is changed so that sampling pitch $\Delta$ of the light field is decreased with keeping the conjugate relationship of the exit pupil of the imaging optical system 101 and the image pickup element 103. Symbol $\tau/F$ denotes a length in an azimuth direction of an image that is formed on the image pickup element 103 by a ray that passes through one small lens located near the optical axis of the lens array 102 on conditions that the F number of the imaging optical system 101 is F. When $\tau/F$ exceeds $\Delta_{LA}$, it is mixed with the image formed by the adjacent small lens, and therefore a correct light field cannot be obtained. Accordingly, when the interval between the lens array 102 and the image pickup element 103 is changed in a case where the F number of the imaging optical system 101 is F, a condition in which the crosstalk is not generated is $\tau/(F\Delta_{LA}) \leq 1$.

As described above, however, the small lens of the lens array 102 connects the exit pupil of the imaging optical system 101 with the image pickup element 103 in a substantially conjugate relationship. Therefore, the interval between of the lens array 102 and the image pickup element 103 needs to be changed in a range where the exit pupil and the image pickup element 103 are included in the depth of focus of the lens array 102. Accordingly, arranging the image pickup element 103 at an end of the depth of focus of the lens array 102 in a case where the F number of the imaging optical system 101 is $F_0$ and also the exit pupil position is closest to the image side, a movable range of the lens array 102 can be increased. In this case, the following Expression (3) is met.

$$\Delta \frac{f_{LA} P_0}{P_0 + f_{LA}} = \Delta_{LA}\left(\frac{f_{LA} P_0}{P_0 + f_{LA}} - \tau_0\right) \tag{3}$$

In Expression (3), symbol $P_0$ denotes a maximum value of the interval between the exit pupil plane 101b and the object side principal plane of the lens array 102 in a case where the F number of the imaging optical system 101 is $F_0$, and symbol $f_{LA}$ denotes a focal length of the lens array 102. Symbol $\tau_0$ denotes an interval between the image side principal plane of the lens array 102 and the image pickup element 103 in a case where the F number of the imaging optical system 101 is $F_0$ and also the exit pupil position is closest to the image side. Commonly, since $P_0 \gg \Delta$ is met, the focal length $f_{LA}$ can be approximated as the following Expression (4) using Expression (3).

$$f_{LA} = \frac{\Delta_{LA}}{\Delta_{LA} - \Delta} \tau_0 \tag{4}$$

Therefore, the F number of the small lens that constitutes the lens array 102 is represented as $F_{LA} = \tau_0/(\Delta_{LA}-\Delta)$. Since the pixel pitch of the image pickup element 103 is $\Delta$, the depth of field of the lens array 102 at the image side can be approximately estimated as $\pm F_{LA}\Delta$ from the focus position. Accordingly, if it is in a range from $\tau_0$ to $2F_{LA}\Delta$, the imaging relationship is substantially maintained even when the interval between the lens array 102 and the image pickup element 103 is increased.

When the interval between the image side principal plane of the lens array 102 and the image pickup element 103 is increased by $2F_{LA}\Delta$ from $\tau_0$, a maximum value $F_{max}$ of the F number of the imaging optical system 101 at which the crosstalk and the dead zone are minimized is represented as the following Expression (5).

$$F_{max} = \frac{f_{LA} + F_{LA}\Delta}{f_{LA} - F_{LA}\Delta} F_0 = \frac{\Delta_{LA}+\Delta}{\Delta_{LA}-\Delta} F_0 \tag{5}$$

Therefore, it is preferable that the interval between the lens array 102 and the image pickup element 103 is changed while meeting $\tau/(F\Delta_{LA}) \leq 1$ on conditions that the F number of the imaging optical system 101 meets $F \leq F_{max}$, and the interval is not more than a value where the imaging relationship of the lens array 102 is maintained on conditions that $F > F_{max}$ is met. This case division is a case division represented by Expression (2). Furthermore, using the depth of focus of the lens array 102, a maximum value $\tau_{max}$ of $\tau$ is given by the following Expression (6).

$$\tau_{max} = \frac{\Delta_{LA}+\Delta}{\Delta_{LA}-\Delta} F_0 \Delta_{LA} = F_{max}\Delta_{LA} \tag{6}$$

When an amount of the crosstalk is small, the obtained light field does not depart from a correct value so much. The reconstruction may also be performed using only the pixel in which the crosstalk is not generated at the time of the reconstruction. Therefore, even when a value of $\tau/(F\Delta_{LA})$ exceeds 1, there is no problem if the amount is small. Therefore, when the value of $\tau/(F\Delta_{LA})$ exceeds 1.2 that is the upper limit of Expression (2), the number of the pixels where the crosstalk is generated is increased and the number of the pixels which can be used for the reconstruction is decreased. On the other hand, when the value of $\tau/(F\Delta_{LA})$ is lower than 0.4 that is the lower limit of Expression (2), a ratio of being occupied by the dead zone is increased in a case where F is increased, and the amount of the obtained information of the light field is decreased. Therefore, including the value in the range of Expression (2), the generations of the dead zone and the crosstalk can be reduced so that the light field can be efficiently obtained when the pupil of the imaging optical system 101 is varied.

More preferably, setting the range of the following Expression (2a), the decrease of the amount of the information of the obtained light field and the deterioration of the accuracy of the obtained light field caused by the variation of the pupil can be further reduced.

$$0.5 < \frac{\tau}{F\Delta_{LA}} < 1.1 \quad \left(F \leq F_0 \frac{\Delta_{LA}+\Delta}{\Delta_{LA}-\Delta}\right) \\ 0.5 < \frac{\tau}{F_0\Delta_{LA}} \frac{\Delta_{LA}-\Delta}{\Delta_{LA}+\Delta} < 1.1 \quad \left(F > F_0 \frac{\Delta_{LA}+\Delta}{\Delta_{LA}-\Delta}\right)$$ (2a)

In the present embodiment, $\Delta=0.0043$ (mm), $\Delta_{LA}=0.0215$ (mm), and $F_0=2.9$ are met. In addition, $\tau_0=0.06235$ (mm) is met, and the size of the image of the exit pupil formed on the image pickup element 103 by one small lens is almost the same as the pitch of the lens array 102. In other words, the generation of the dead zone or the crosstalk is reduced when the F number is equal to $F_0$.

Figure 13A:
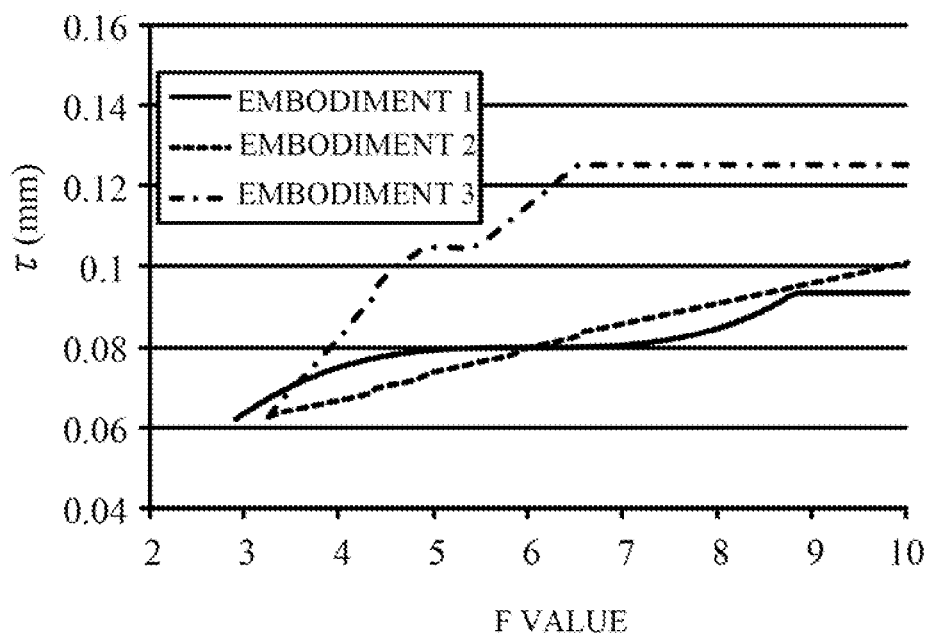
FIGS. 13A to 13C are diagrams of illustrating relationships between an aperture (F number) and τExpression (2), and an effective pixel ratio, respectively, in each of Embodiments 1 to 3.
Figure 13B:
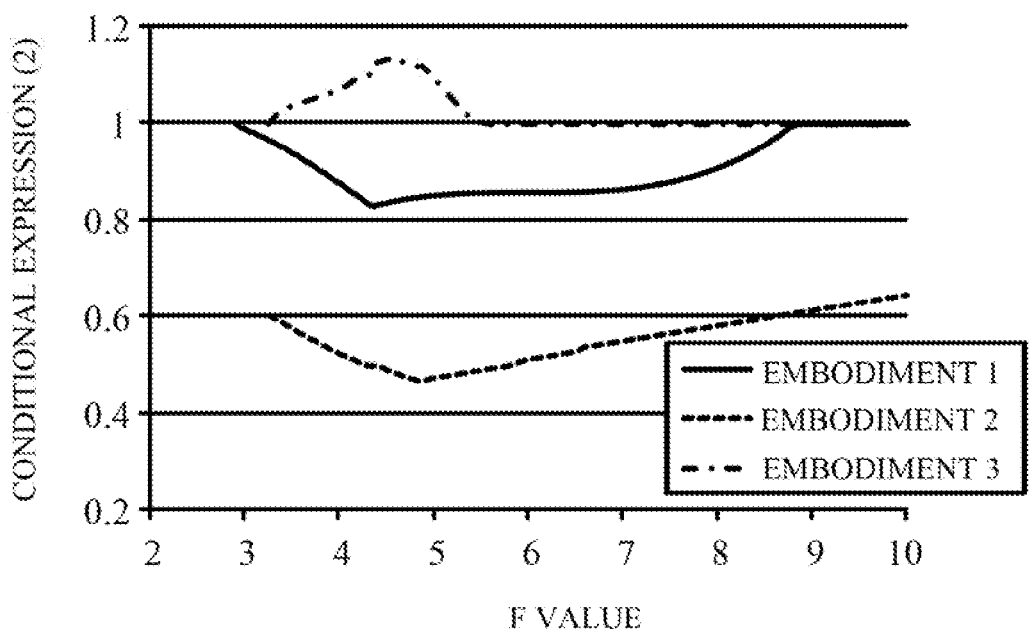
Figure 13C:
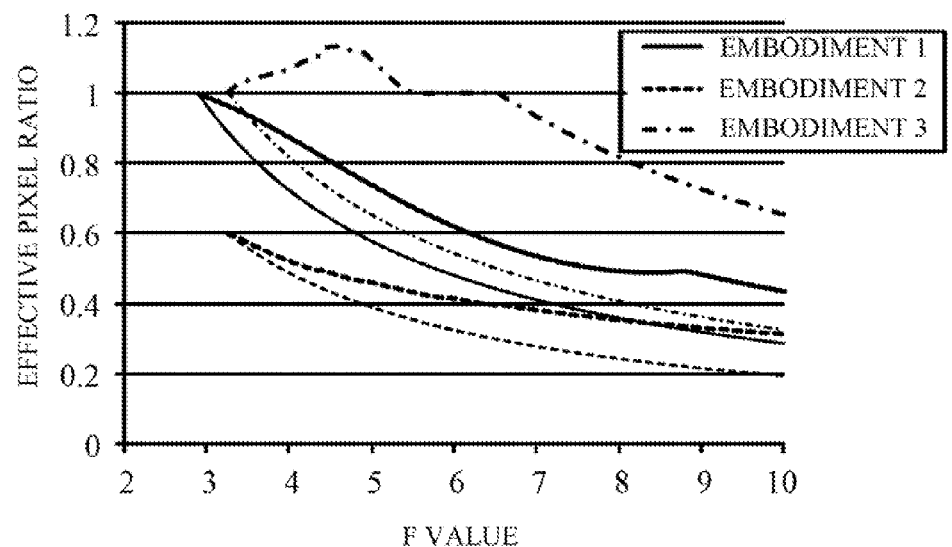

FIGS. 13A, 13B, and 13C are diagrams of illustrating the relationships between the aperture (the F number) and $\tau$, Expression (2), and the effective pixel ratio, respectively. In each of FIGS. 13A to 13C, the relationship in the present embodiment is indicated by a solid line. The solid line in FIG. 13A indicates how to change the value of $\tau$ when the F number is changed by narrowing the aperture of the imaging optical system 101. In FIG. 13A, a horizontal axis indicates the F number of the imaging optical system 101, and a vertical axis indicates the distance $\tau$ from the image side principal plane of the lens array 102 to the image pickup element 103. The horizontal axis is plotted up to the F number of 10, but the imaging optical system 101 can also indicate a value greater than 10. As illustrated in FIG. 13A, as the F number of the imaging optical system 101 is increased, the distance $\tau$ is increased so as to increase the interval between the lens array 102 and the image pickup element 103. In the present embodiment, using Expressions (5) and (6), $F_{max}=4.35$ and $\tau_{max}=0.09353$ (mm) are obtained. The distance $\tau$ becomes constant from the F number of around 8.9 in FIG. 13A because $\tau=\tau_{max}$ is met. When the distance $\tau$ is larger than this distance, the imaging relationship of the lens array 102 cannot be maintained, and therefore the light field cannot be correctly obtained.

FIG. 13B illustrates the value of Expression (2) in this case. Even when the F number is changed, the value is within the range of Expression (2). The value becomes flat from the F number of around 8.9 because $\tau=\tau_{max}$ is met. FIG. 13C illustrates an effect that is caused by changing the interval between the lens array 102 and the image pickup element 103. In FIG. 13C, the effective pixel ratio of the vertical axis is indicated by $\tau/(F\Delta_{LA})$, which indicates a one-dimensional ratio of the pixels which light enters of the pixel unit corresponding to one of the small lenses. The crosstalk is generated when the effective pixel ratio is larger than 1, and on the other hand the dead zone exists when the effective pixel ratio is smaller than 1. When the effective pixel ratio is substantially equal to 1, the generations of the dead zone and the crosstalk are reduced and the light field can be obtained most efficiently. A thin solid line in FIG. 13C is a value in case where the interval between the lens array 102 and the image pickup element 103 is fixed, and the interval between them are changed in accordance with the variation of the pupil so that the effective pixel ratio is closer to 1.

Embodiment 2

Next, Embodiment 2 of the present invention will be described. Since a basic configuration of an image pickup apparatus in the present embodiment is similar to the image pickup element of Embodiment 1 described with reference to FIG. 4, descriptions thereof will be omitted.

Figure 14:
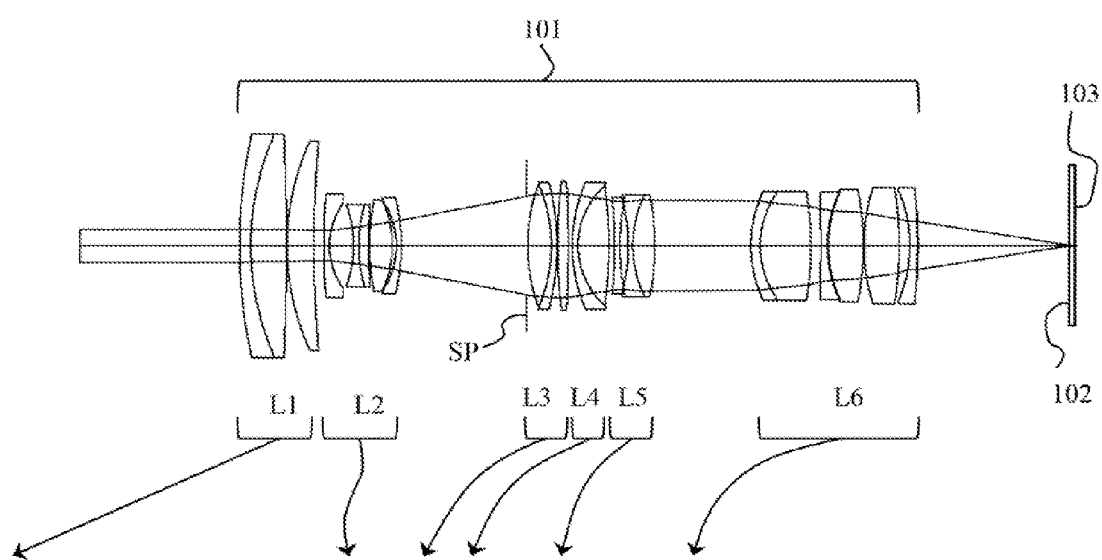
FIG. 14 is a cross-sectional diagram of the image pickup optical system in each of Embodiments 2 and 3.

FIG. 14 is a cross-sectional diagram of an image pickup optical system in the present embodiment. The imaging optical system 101 of FIG. 14 is a zoom lens. The imaging optical system 101 includes a first lens unit L1 that has a positive refractive power, a second lens unit L2 that has a negative refractive power, and a third lens unit L3 that has a positive refractive power. The imaging optical system 101 further includes a fourth lens unit L4 that has a positive refractive power, a fifth lens unit L5 that has a negative refractive power, and a sixth lens unit L6 that has a positive refractive power. The imaging optical system 101 changes the interval of each lens unit during varying the magnification so as to perform the focusing operation using the second lens unit L2. The lens array 102 is formed by small lenses each having a planar shape at the object side and a convex shape at the image side. The lens array 102 is moved in accordance with the variation of the magnification and the focusing of the imaging optical system 101, and the variation of the pupil caused by narrowing the aperture (the position or the size of the pupil). The moving method is similar to that of Embodiment 1. According to such a configuration, even when the pupil of the imaging optical system 101 is varied, the decrease of the amount of the information of the obtained light field and the deterioration of the accuracy of the obtained light field can be reduced.

In the present embodiment, $\Delta=0.0064$ (mm), $\Delta_{LA}=0.032$ (mm), and $F_0=3.27$ are met. Furthermore, $\tau_0=0.06279$ (mm) is met, and the size of the image of the exit pupil formed on the image pickup element 103 by one small lens is smaller than the pitch of the lens array 102. A one-dimensional size of the image of the exit pupil corresponds to three pixels while the pitch of the lens array 102 corresponds to five pixels. In other words, per one small lens, there is a dead zone in two pixels for a one-dimensional size or in 16 pixels for a two-dimensional size.

The dashed line in FIG. 13A indicates the change of $\tau$ with respect to the change of the F number that is caused by narrowing the aperture at a wide-angle end of the imaging optical system 101. As the F number is increased, $\tau$ is increased so as to increase the interval between the lens array 102 and the image pickup element 103. Furthermore, in the present embodiment, $F_{max}=4.91$ and $\tau_{max}=0.15698$ (mm) are obtained from Expressions (5) and (6). In the present embodiment, when the F number is smaller than or equal to 10, the graph is not flat as Embodiment 1 because $\tau$ does not reach $\tau_{max}$. However, when the F number is further increased so as to meet $\tau=\tau_{max}$, the lens array 102 does not move to the object side any more. A dashed line in FIG. 13B indicates a value of Expression (2) in this case. The value is within the range of Expression (2) over a whole of the F number. FIG. 13C illustrates an effect that is caused by the change of the interval between the lens array 102 and the image pickup element 103. The dashed thin line in FIG. 13C is an effective pixel ratio in a case where the interval between the lens array 102 and the image pickup element 103 is fixed. As illustrated in FIG. 13C, changing the interval between them in accordance with the variation of the pupil, the effective pixel ratio comes close to 1.

Figure 15:
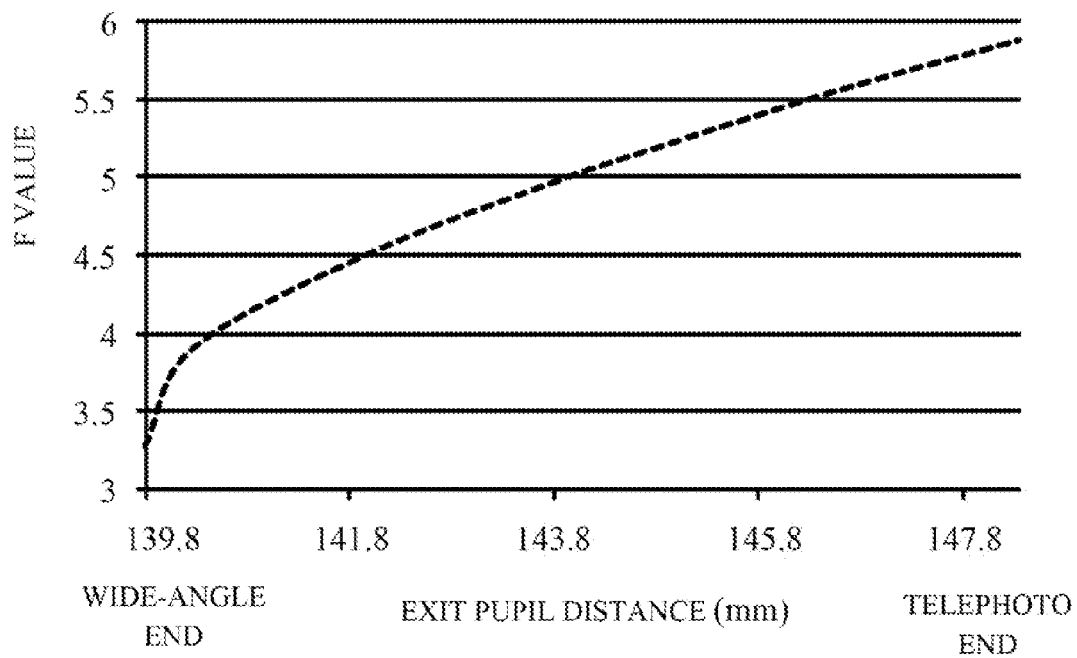
FIG. 15 is a diagram of illustrating relationships between a magnification of the imaging optical system (an exit pupil distance) and the F number in each of Embodiments 2 and 3.

Next, the change of $\tau$ in varying the magnification of the imaging optical system 101 will be described. The imaging optical system 101 has a focal length of 28.9 mm at the wide-angle end and 291.4 mm at the telephoto end. FIG. 15 is a diagram of illustrating the change of the F number of the imaging optical system 101 in varying the magnification from the wide-angle end to the telephoto end in a full-open state of the aperture. A horizontal axis indicates an exit pupil distance that is an interval between the exit pupil plane 101b of the imaging optical system 101 and an image side focal point. In the present embodiment, the exit pupil distance is minimized at the wide-angle end, and is maximized at the telephoto end. As illustrated in FIG. 15, since the F number is increased by the increase of the magnification, it is considered that the dead zone is increased.

Figure 16A:
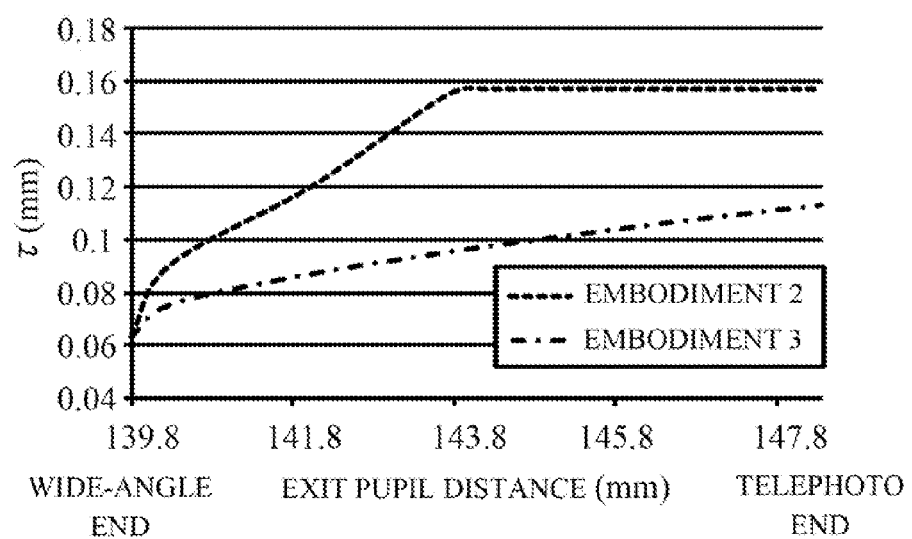
FIGS. 16A to 16C are diagrams of illustrating the magnification and τ, Expression (2), and the effective pixel ratio, respectively, in each of Embodiments 2 and 3.
Figure 16B:
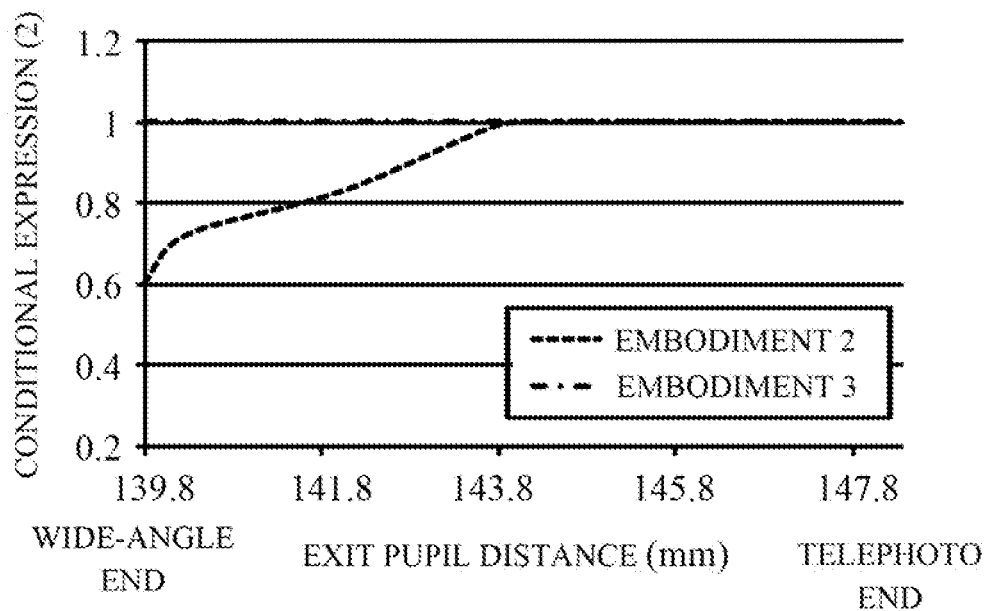
Figure 16C:
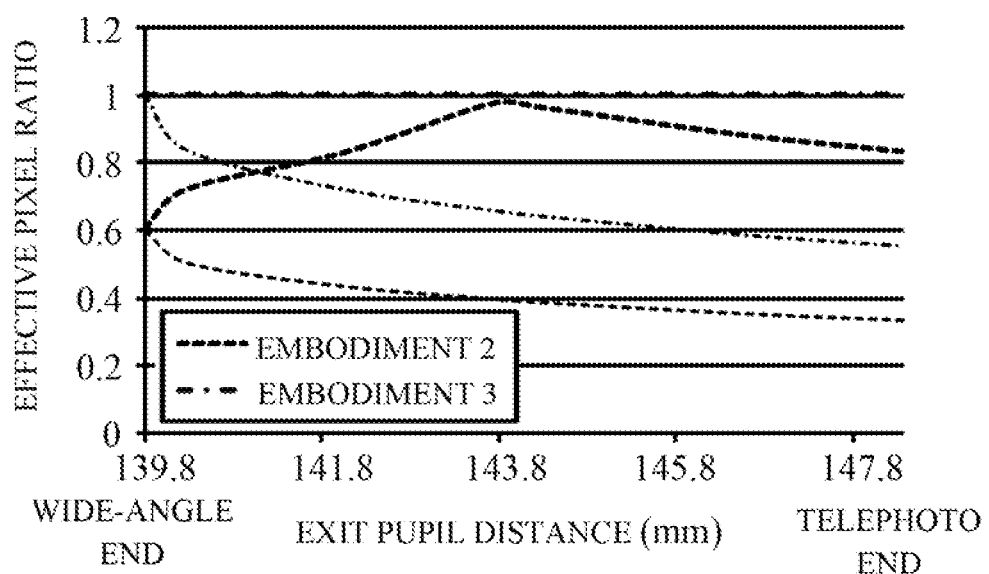

FIGS. 16A, 16B, and 16C are diagrams of illustrating the relationships between the magnification (the exit pupil distance) and $\tau$, Expression (2), and the effective pixel ratio, respectively. In each of FIGS. 16A to 16C, the relationship in the present embodiment is indicated by a dashed line. The dashed line in FIG. 16A indicates the change of $\tau$ with respect to the magnification. As the exit pupil is moved to the object side, $\tau$ is increased. The value of $\tau$ becomes constant from the exit pupil distance of around 143.8 because $\tau=\tau_{max}$ is met. FIG. 16B illustrates the value of Expression (2) in this time. As illustrated in FIG. 16B, the value is within the range of Expression (2) for whole of the magnification region. The value of $\tau$ becomes constant from the exit pupil distance of around 143.8 because $\tau=\tau_{max}$ is met. FIG. 16C illustrates the effective pixel ratio in this time. The dashed thin line in FIG. 16C indicates a value of a case where the interval between the lens array 102 and the image pickup element 103 is fixed. The effective pixel ratio is around 0.6 at the wide-angle end because a ray enters three pixels per one small lens for a one-dimensional size and two pixels are the dead zone as described above. As illustrated in FIG. 16C, changing the interval between the lens array 102 and the image pickup element 103, the effective pixel ratio comes close to 1.

Embodiment 3

Figure 17:
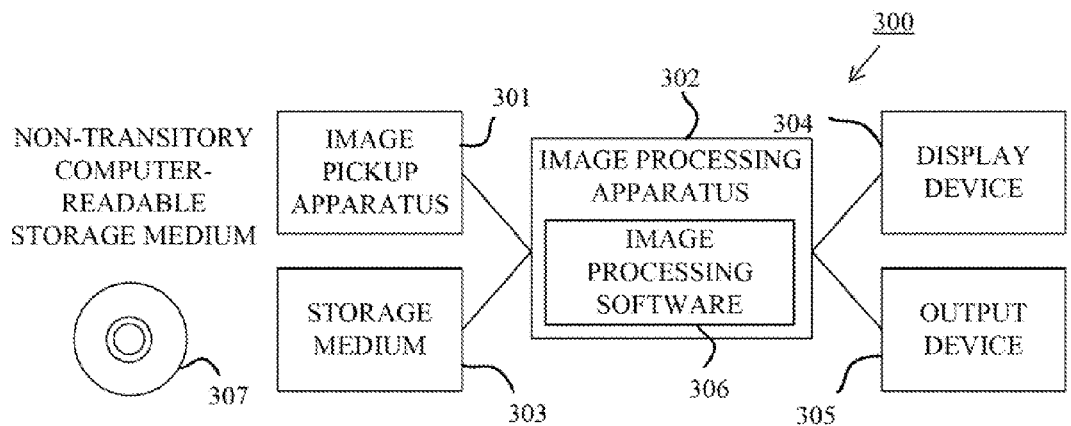
FIG. 17 is a block diagram of an image processing system in each of Embodiments 3 and 6.

Next, Embodiment 3 of the present invention will be described. The present embodiment describes an image processing system to which the image pickup apparatus described above is applied. FIG. 17 is a block diagram of an image processing system 300 in the present embodiment. As illustrated in FIG. 17, the image processing system 300 includes an image pickup apparatus 301. The image pickup apparatus 301 includes the image pickup optical system that includes the configuration of FIG. 1, and a cross section of the image pickup optical system is as illustrated in FIG. 14. An image processing apparatus 302 is a computer device that performs the image reconstruction described above. The image processing apparatus 302 includes a storage portion that stores image pickup condition information of the input image obtained by the image pickup apparatus 301. The image processing apparatus 302 performs a predetermined reconstruction processing for this input image, and outputs the processing result (the output image) to any one or a plurality of an output device 305, a display device 304, and a storage medium 303.

The storage medium 303 is, for example a semiconductor memory, a hard disk, or a server on a network. The output device 305 is for example a printer. The display device 304 is connected to the image processing apparatus 302, and the reconstructed image is inputted to the display device 304. A user can work while confirming the reconstructed image via the display device 304. Image processing software 306 (an image processing program) performs a development processing and other image processings if needed, as well as the reconstruction processing (the image processing method) described above. The display device 304 is for example a liquid crystal display or a projector. The image pickup optical system of the image pickup apparatus 301 and the drive portion 1001 of the lens array 102 are the same as those of Embodiment 2, and therefore descriptions thereof are omitted.

The present embodiment can also be achieved by performing the following processing. In other words, it is a processing in which software (a program) that achieves the function of the embodiments described above is provided to the system or the apparatus via a network or each of various kinds of storage media 307 (non-transitory computer-readable storage media) such as a CD-ROM so that a computer (CPU, MPU, or the like) of the system or the apparatus can read the program to be executed.

In the present embodiment, $\Delta=0.0064$ (mm), $\Delta_{LA}=0.0192$ (mm), and $F_0=3.27$ are met. Furthermore, $\tau_0=0.06279$ (mm) is met, and the size of the image of the exit pupil formed on the image pickup element 103 by one small lens is substantially equal to the pitch of the lens array 102. A dashed-dotted line in FIG. 13A indicates the change of $\tau$ with respect to the change of the F number caused by narrowing the aperture at the wide-angle end of the imaging optical system 101. As the F number is increased, $\tau$ is increased so as to increase the interval between the lens array 102 and the image pickup element 103. In the present embodiment, using Expressions (5) and (6), $F_{max}=6.54$ and $\tau_{max}=0.12559$ (mm) are obtained. The equation of $\tau=\tau_{max}$ is met when the F number is 6.54, and therefore the lens array 102 is fixed at the F number larger than or equal to it.

A dashed-dotted line in FIG. 13B indicates the value of Expression (2) in this time. As illustrated in FIG. 13B, the value is within the range of Expression (2) over the whole region of the F number. In the range of the F number of 3.3 to 5.4, Expression (2) exceeds 1 and therefore the crosstalk is generated. In this case, the reconstruction processing may be performed as it is if the influence of the crosstalk is small. Alternatively, the reconstruction may also be performed using only the pixels in which the crosstalk is not generated. A dashed-dotted line in FIG. 13C indicates an effect that is caused by the change of the interval between the lens array 102 and the image pickup element 103 in this time. The dashed-dotted thin line in FIG. 13C indicates a value that is obtained when the interval between the lens array 102 and the image pickup element 103 is fixed. As illustrated in FIG. 13C, moving the lens array 102 in accordance with the variation of the pupil, the effective pixel ratio comes close to 1. The effective pixel ratio exceeds 1 in a region where the crosstalk occurs, but it is close to 1 compared to the case where the interval is fixed.

Next, the change of $\tau$ in varying the magnification of the imaging optical system 101 in the full-open state of the aperture will be described. The changes of the exit pupil distance and the F number caused by varying the magnification are as described in Embodiment 2. The dashed-dotted line in FIG. 16A illustrates the change of τ with respect to the magnification (the exit pupil distance). As the exit pupil is moved to the object side, τ is increased. Since τ does not exceed $τ_{max}$ even in the telephoto end, the graph is not flat differently from Embodiment 2. The dashed-dotted line of FIG. 16B indicates the value of Expression (2) in this time. As illustrated in FIG. 16B, the value is within the range of Expression (2) over the whole region of the magnification. Since the value is always 1, the interval between the lens array 102 and the image pickup element 103 is changed to be a state where the efficiency of obtaining the light field is maximized. The dashed-dotted line in FIG. 16C indicates the effective pixel ratio in this time. The dashed-dotted thin line in FIG. 16C is a value that is obtained when the interval between the lens array 102 and the image pickup element 103 is fixed. Changing the interval between the lens array 102 and the image pickup element 103 in accordance with the variation of the pupil, the effective pixel ratio becomes 1 and therefore the light field can be efficiently obtained.

Embodiment 4

Next, Embodiment 4 of the present invention will be described. Since a basic configuration of an image pickup apparatus in the present embodiment is similar to the image pickup apparatus of Embodiment 1 with reference to FIG. 4, descriptions thereof will be omitted. An image pickup optical system of the present embodiment includes the configuration illustrated in FIG. 3, and a cross section of the image pickup optical system is illustrated in FIG. 23.

Figure 2:
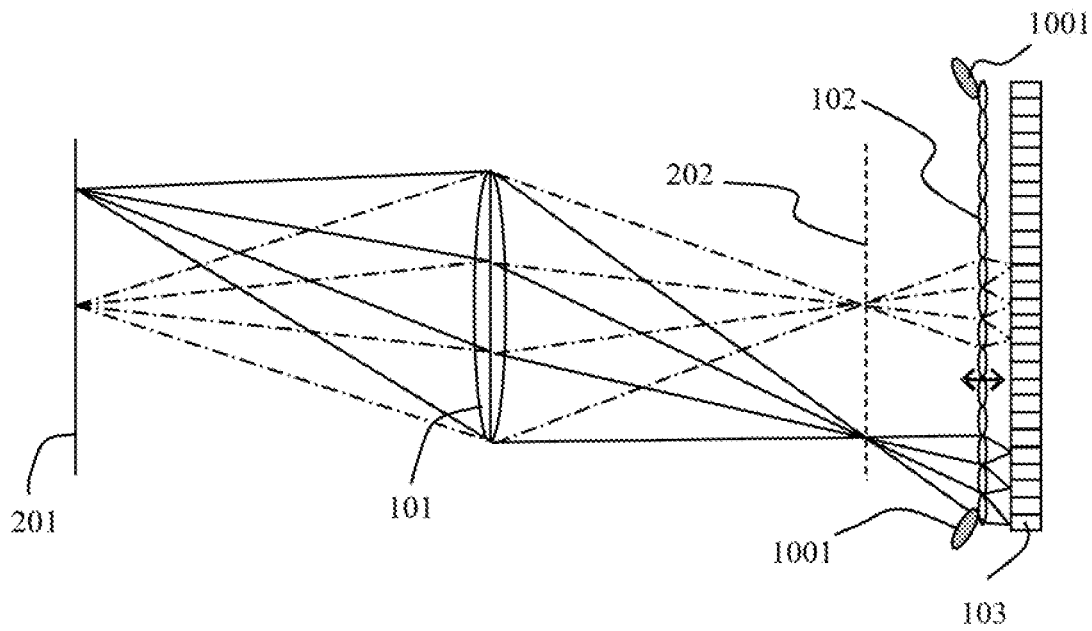
FIG. 2 is a schematic configuration diagram of an image pickup optical system in Embodiment 5.
Figure 3:
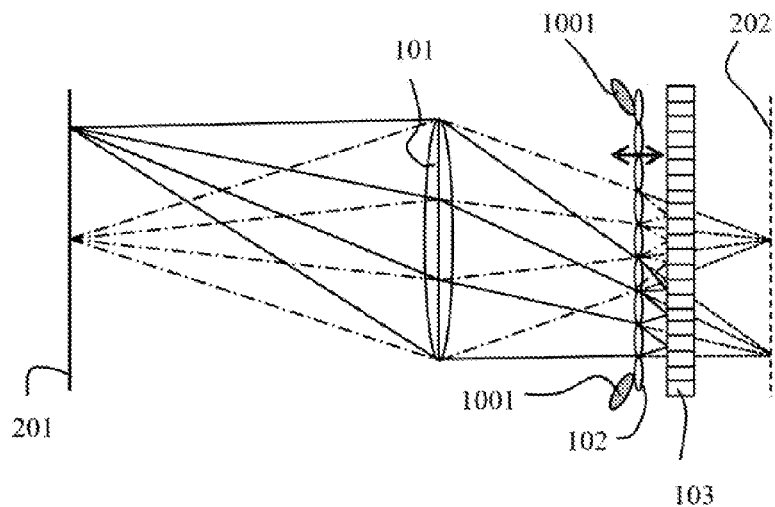
FIG. 3 is a schematic configuration diagram of an image pickup optical system in each of Embodiments 4 and 6.

In the configuration of FIG. 3, the lens array 102 is disposed at the object side relative to the image side conjugate plane 202 of the imaging optical system 101 with respect to the object plane 201. In addition, the image side conjugate plane 202 and the image pickup element 103 are disposed so as to be conjugate to each other via the lens array 102. In other words, the lens array 102 is disposed so that a conjugate plane (the image side conjugate plane 202) of the imaging optical system 101 with respect to the object plane 201 and the image pickup element 103 are conjugate to each other. A ray from the object plane 201 passes through the imaging optical system 101 and the lens array 102, and then enters the pixels different from each other of the image pickup element 103 in accordance with a position and an angle of the ray on the object plane 201 so as to obtain the light field. As a result, an image in which a plurality of small images having different shot points of view and shot range is obtained by the image pickup element 103. This characteristic is true for the configuration of FIG. 2 described below with reference to Embodiment 5. The configuration of FIG. 2 is the same as the configuration illustrated in FIG. 3 of the present embodiment except that the lens array 102 is disposed at the image side relative to the image side conjugate plane 202. The difference from the configuration of FIG. 3 is that the lens array 102 views the image formed by the imaging optical system 101 as a real object instead of an imaginary object so as to be re-imaged onto the image pickup element 103. However, the configurations of FIGS. 2 and 3 are essentially the same since the lens array 102 views the image that is formed by the imaging optical system 101 as an object so that the image is imaged on the image pickup element 103 in both of them.

Figure 23:
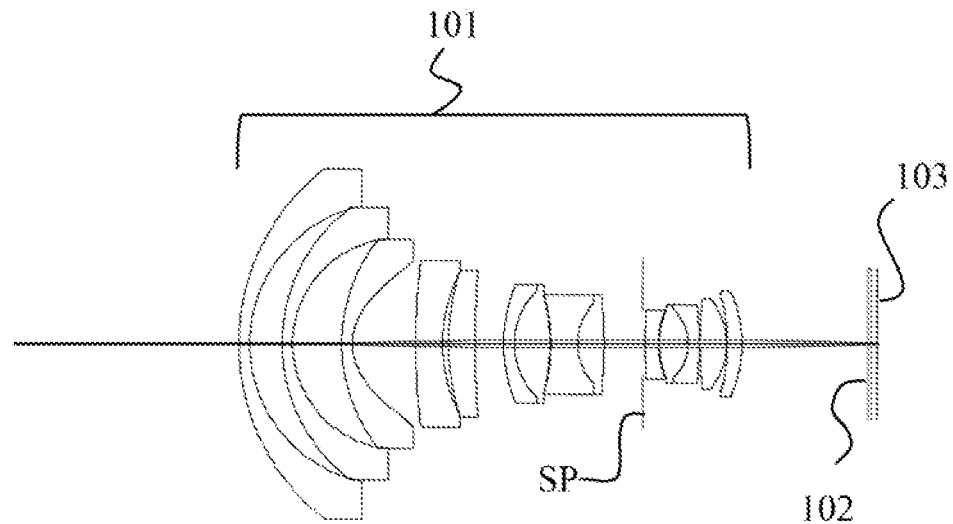
FIG. 23 is a cross-sectional diagram of the image pickup optical system in Embodiment 4.

The imaging optical system 101 illustrated in FIG. 23 is a single focus lens. The lens array 102 has both surfaces each having a convex shape, but similarly to Embodiment 1, the present embodiment is not limited to this shape. In addition, the drive portion 1001 is the same as that of Embodiment 1.

Figure 18A:
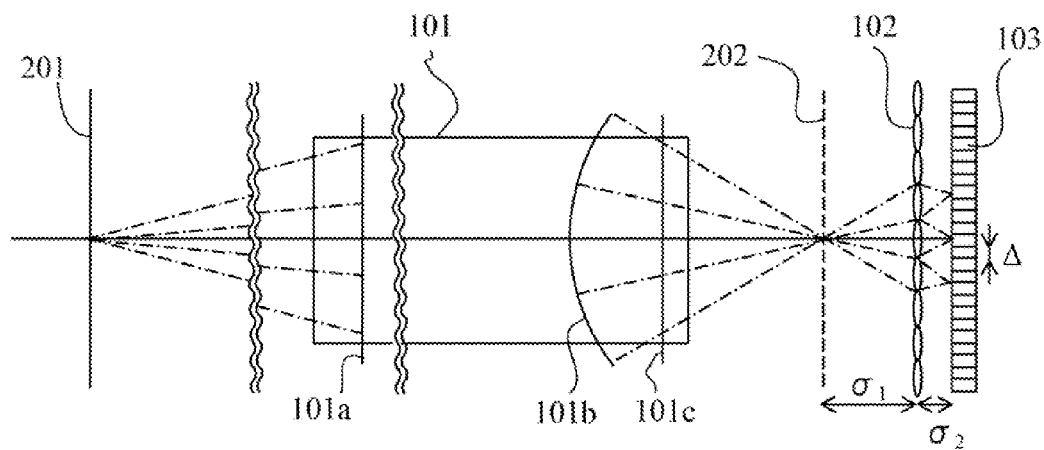
FIGS. 18A to 18C are diagrams of describing the image pickup optical system in Embodiment 4.
Figure 18B:
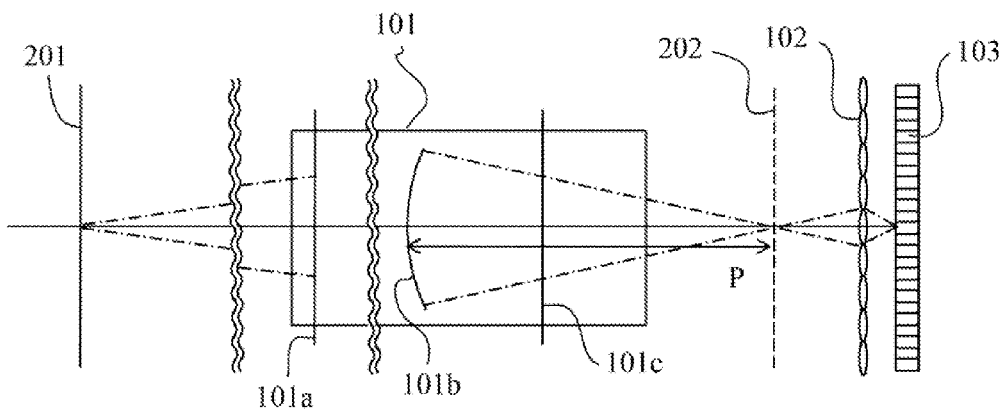
Figure 18C:
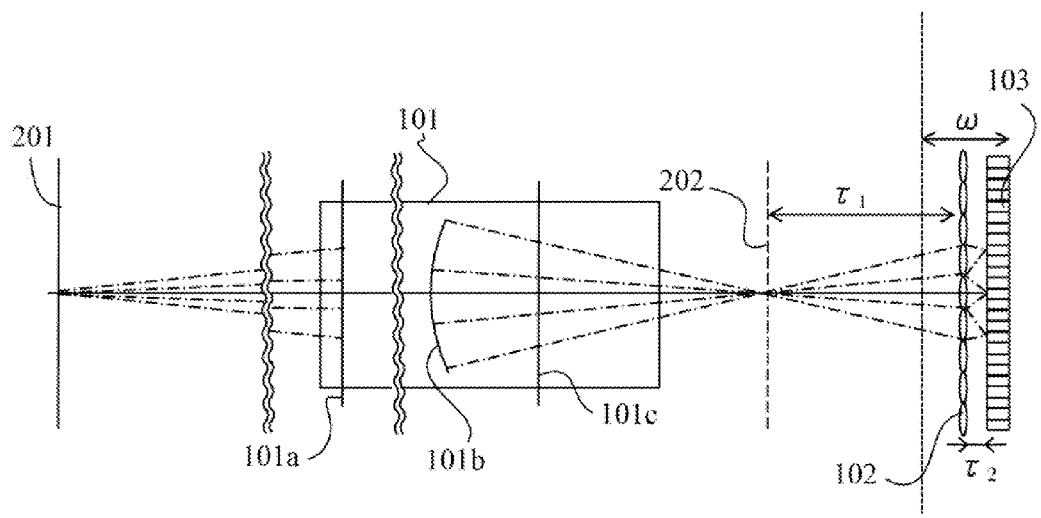

Subsequently, similarly to Embodiment 1, the decrease of the amount of the information of the obtained light field and the deterioration of the accuracy of the obtained light field that are caused by the variation of the pupil in the configuration will be described. For easy understanding, an example of the configuration of FIG. 2 is described, but the same discussion is true for the configuration illustrated in FIG. 3. FIGS. 18A to 18C are diagrams in which the object side principal plane 101a of the imaging optical system 101, the exit pupil plane 101b, and the image side principal plane 101c are added to FIG. 2. As illustrated in FIG. 18A, a ray passing through the same position on the object plane 201 is divided in accordance with the angle so as to enter the pixels different from each other, and therefore the light field can be obtained. In FIG. 18A, a region on the image pickup element 103 which the ray passing through the small lens located near the optical axis of the lens array 102 enters is configured so as to be substantially the same as the pitch of the lens array 102. When the region is smaller than the pitch of the lens array 102, the dead zone is generated as illustrated in FIG. 5A. On the other hand, when the region is larger than the pitch of the lens array 102, the crosstalk is generated as illustrated in FIG. 5B. Therefore, the state of FIG. 18A is a state where a correct light field can be efficiently obtained without wasting the pixels.

Figure 19:
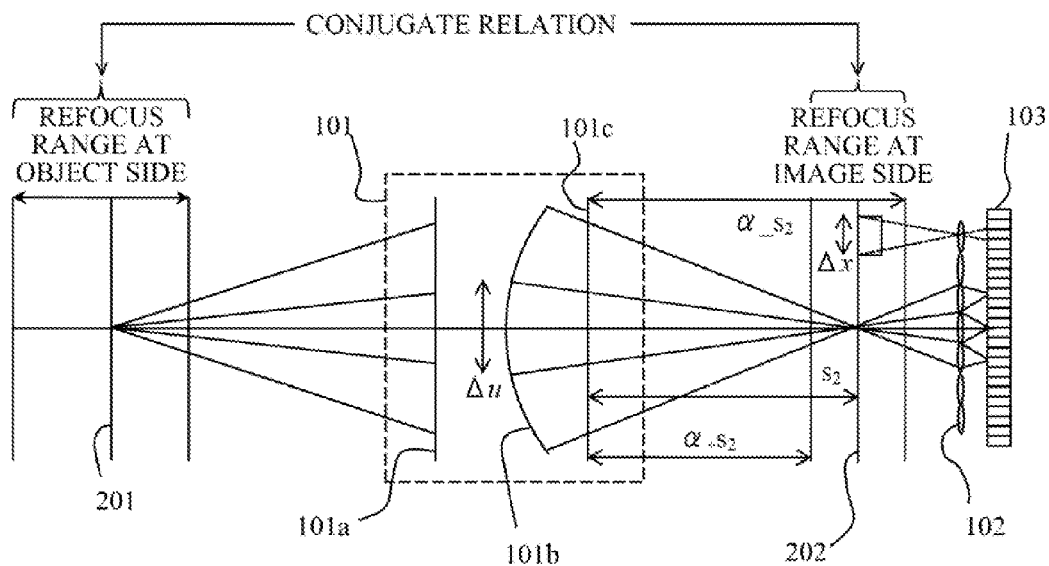
FIG. 19 is a diagram of a refocus range in Embodiment 4.

FIG. 18B illustrates a state in which the exit pupil plane 101b of the imaging optical system 101 is changed from the state of FIG. 18A. As illustrated in FIG. 18B, the division number of the ray passing through the same position on the object plane 201 is decreased by reducing the size of the exit pupil plane 101b and also moving to the object side. In FIG. 18B, the division number of the ray is 1, and therefore the angle component of the light field cannot be obtained. Accordingly, the dead zone is increased in the image pickup element. On the contrary, when the size of the exit pupil plane 101b is increased or the exit pupil plane 101b is moved to the image side, the crosstalk is generated and therefore a correct light field cannot be obtained. The influence of the decrease of the amount of the information of the obtained light field and the deterioration of the accuracy of the obtained light field is similar to that of Embodiment 1. The refocus range in the configuration of FIG. 2 is as illustrated in FIG. 19. This relationship is true for the configuration of FIG. 3.

Figure 20A:
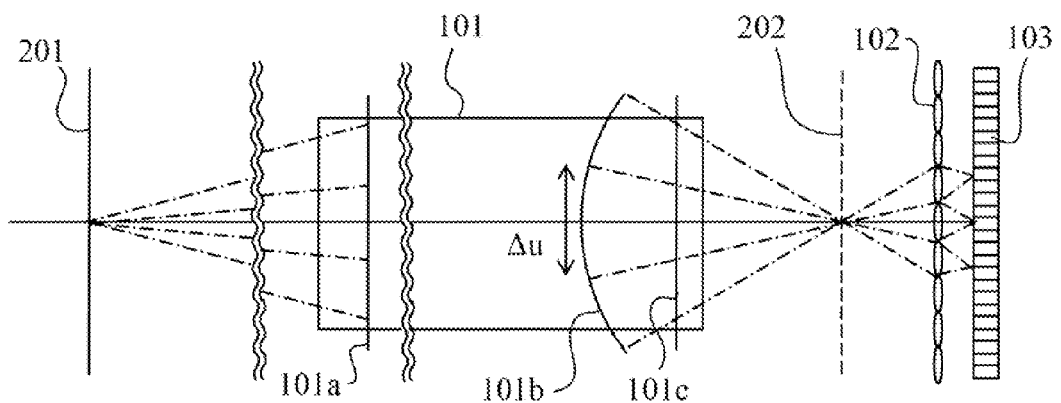
FIGS. 20A to 20C are diagrams of illustrating an influence of variation of a pupil of the image pickup optical system in Embodiment 4.
Figure 20B:
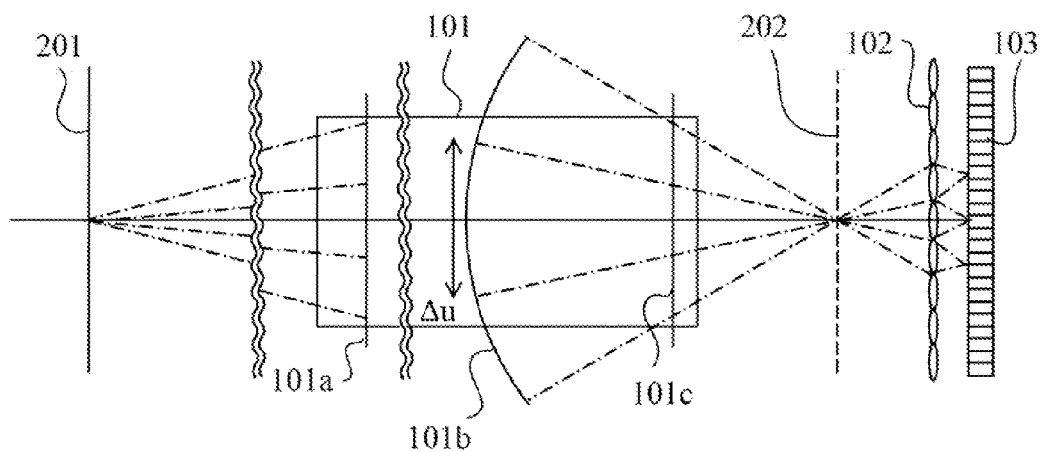
Figure 20C:
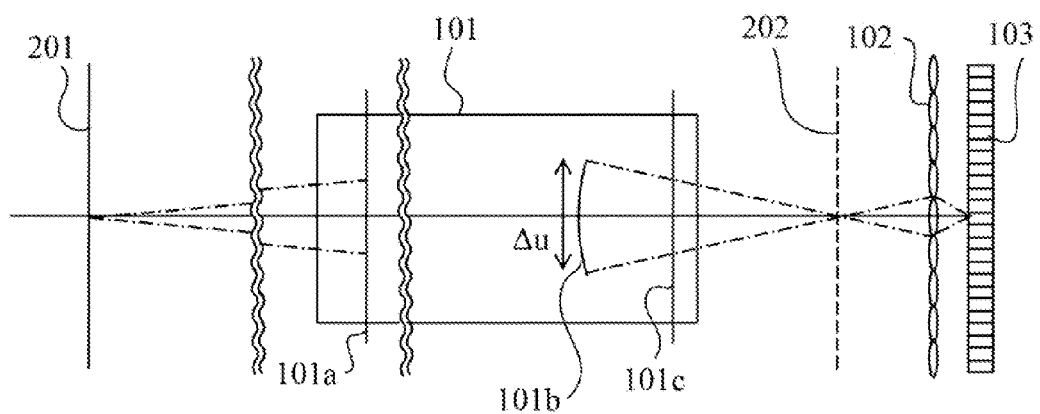

Next, referring to FIGS. 20A to 20C, the influence of the variation of the pupil of the imaging optical system 101 will be described in detail. Similarly to Embodiment 1, the influence is considered by being divided into the case where the F number of the imaging optical system 101 is constant and the exit pupil position is changed and the case where the exit pupil position is constant and the F number is changed. FIGS. 20A to 20C are diagrams of illustrating the influences of the variation of the pupil of the image pickup optical system in the present embodiment. FIGS. 20A and 20B illustrate the case where the F number of the imaging optical system 101 is constant and the exit pupil position is varied, and FIGS. 20A and 20C illustrates the case where the exit pupil position of the imaging optical system is constant and the F number is varied.

First of all, the influence of the case where the F number of the imaging optical system 101 is constant and the exit pupil position is varied will be described. When the F number is constant while the exit pupil (the exit pupil plane 101b) is moved to the object side as the change of the state of FIG. 20A to the state of FIG. 20B, the value of the sampling pitch Δu is increased and the accuracy of the obtained light field is deteriorated. In order to improve the degree of freedom of the image that is generated by the reconstruction, it is necessary to decrease the sampling pitch Δu when the pupil of the imaging optical system 101 is varied.

Next, the dead zone on the image pickup element 103 increases when the F number of the imaging optical system 101 is increased, on the other hand the crosstalk is generated when it is decreased. For example, when the F number is three times as large as that of the imaging optical system of FIG. 20A, the state of FIG. 20C is obtained. In FIG. 20A, the number of pixels corresponding to a light beam from one point on the object plane 201 is three. In FIG. 20C, however, the corresponding pixel is only one pixel, and the two remaining pixels are in the dead zone. On the other hand, when the F number is decreased from the state of FIG. 20A, the light beam from the one point on the object plane 201 is spread so as to enter five or more small lenses. When the configuration of FIG. 20A is changed so as to decrease the dead zone, the number of pixels corresponding to one point of the object plane 201 is changed from three to five or more, and therefore the ray enters a pixel corresponding to another position to generate the crosstalk. As a result, the information is inefficiently obtained. In this case, although the sampling pitch of the light field does not change, the amount of obtainable information is decreased. This point is apparent if comparing FIG. 20A with FIG. 20C. Accordingly, as illustrated in FIG. 18C, changing the interval between the lens array 102 and the image pickup element 103 in accordance with the variation of the pupil (the position or the size of the pupil) of the imaging optical system 101, the decrease of the amount of the obtained light field and the deterioration of the accuracy of the obtained light field can be reduced.

Next, a way to change the interval between the lens array 102 and the image pickup element 103 in the present embodiment will be described in detail. Absolute values of a distance from the image side focal point of the lens array 102 to the image pickup element 103 in a first state and a second state of the imaging optical system 101 are referred to as a first absolute value of a distance and a second absolute value of a distance, respectively. The distance from the image side focal point of the lens array 102 to the image pickup element 103 means a distance from the image side focal point to a light receiving surface (a surface at the object side) of the image pickup element 103. When the F number of the imaging optical system 101 is larger or the exit pupil position is located at the object side in the second state compared to the first state, the second absolute value of the distance may be set to be smaller than the first absolute value of the distance. As a result, the generation of the dead zone can be reduced and also the sampling pitch of the light field can be decreased.

The increase of the F number of the imaging optical system 101 causes the increase of the dead zone and the decrease of the amount of the information of the light field. When the position of the exit pupil of the imaging optical system 101 is constant, the absolute values of the distance from the image side focal point of the lens array 102 to the image pickup element 103 in states of a first F number and a second F number of the imaging optical system 101 are referred to as a first absolute value of a distance and a second absolute value of a distance, respectively. When the second F number is larger than the first F number, the second absolute value of the distance may be set to be smaller than the first absolute value of the distance. In other words, with regard to the absolute value of the distance from the image side focal point of the lens array 102 to the image pickup element 103, compared to the first absolute value of the distance that is obtained when the imaging optical system 101 has the first F number, the second absolute value of the distance that is obtained when it has the second F number larger than the first F number is set to be small. The system controller 111 controls the interval between the lens array 102 and the image pickup element 103 so as to meet the above relationship. As a result, the decrease of the amount of the obtained light field caused by the variation of the pupil can be reduced as illustrated in FIGS. 18A and 18C.

As the exit pupil position of the imaging optical system 101 comes close to the object side, the sampling pitch Δu is increased, and the sampling pitch of the light field is also increased. In the embodiment, a case where the F number of the imaging optical system 101 is constant is considered. In this case, absolute values of a distance from the object side focal point of the lens array 102 to the image pickup element 103 in states where the exit pupil positions of the imaging optical system 101 are located at a first position and a second position are referred to as a first absolute value of a distance and a second absolute value of a distance, respectively. When the second position is located at the object side relative to the first position, the second absolute value of the distance may be smaller than the first absolute value of the distance. In other words, with regard to the absolute value of the distance from the image side focal point of the lens array 102 to the image pickup element 103, compared to the first absolute value of the distance in a case where the position of the exit pupil is located at the first position, the second absolute value of the distance in a case where the it is located at the second position that is the object side relative to the first position is decreased. As a result, as illustrated in FIGS. 18A and 18C, the deterioration of the accuracy of the obtained light field can be reduced.

In addition, similarly to Embodiment 1, it is preferred that the interval between the lens array 102 and the image pickup element 103 be changed so as to increase the value of Δx/Δu when the exit pupil of the imaging optical system 101 is moved to the object side. In the configurations of FIGS. 2 and 3, as illustrated in FIG. 19, Δx is equal to the value of Δ|ρ₁/ρ₂| that is obtained by projecting the pixel onto the image side conjugate plane 202 via the small lens corresponding to this pixel. Symbol ρ₁ denotes an interval between the object side principal plane of the lens array 102 and the image side conjugate plane 202, and symbol ρ₂ denotes an interval between the image side principal plane of the lens array 102 and the image pickup element. Thus, when the exit pupil of the imaging optical system 101 is moved to the object side, the interval is changed so as to increase a value that is obtained by dividing the sampling pitch on the conjugate plane of the lens array 102 with respect to the image pickup element 103 by the sampling pitch on the exit pupil of the imaging optical system 101. Increasing the value of Δx/Δu, the degree of freedom of the image generated by the reconstruction such as a refocus range represented by Expression (1) increases.

The relationship illustrated in FIG. 9 is also met in each of the configurations of FIGS. 2 and 3. Therefore, similarly to Embodiment 1, it is preferred that the interval between the lens array 102 and the image pickup element 103 be changed so that the length between two points at which the two straight lines in FIG. 9 intersect with the image pickup element 103 is not more than the pitch of the lens array 102. More preferably, the interval is changed so that the length between the two points comes close to the pitch of the lens array 102. As a result, the generations of the crosstalk and the dead zone are reduced so that the light field can be efficiently obtained.

Figure 21A:
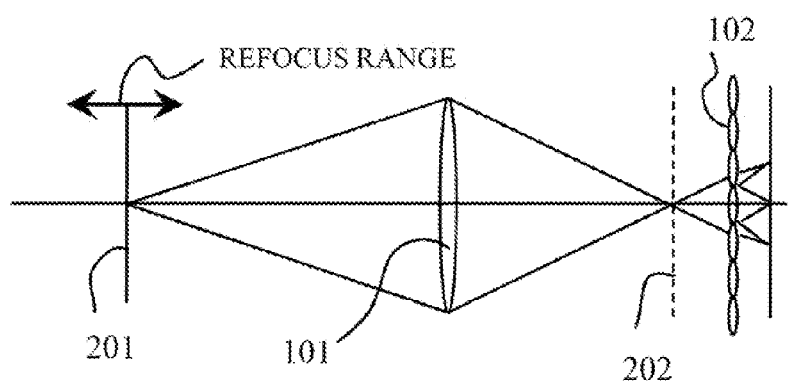
FIGS. 21A to 21C are diagrams of illustrating the magnification of the refocus range in Embodiment 4.
Figure 21B:
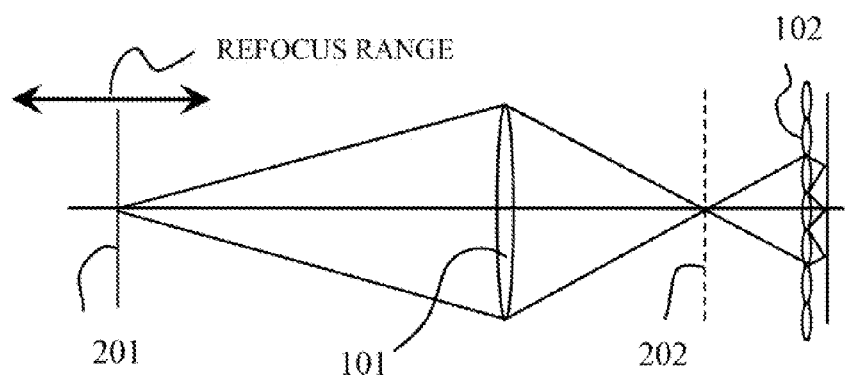
Figure 21C:
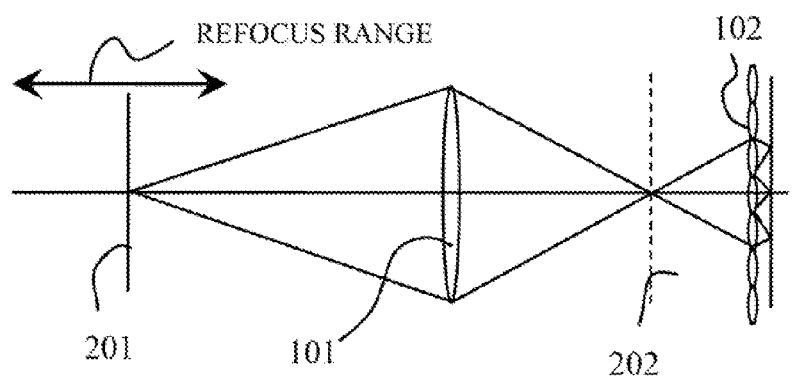
Figure 22A:
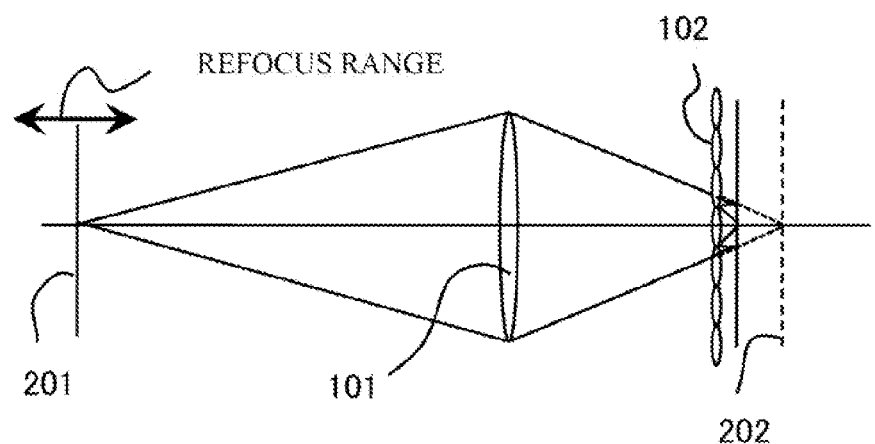
FIGS. 22A to 22C are diagrams of illustrating the magnification of the refocus range in each of Embodiments 4 and 6.
Figure 22B:
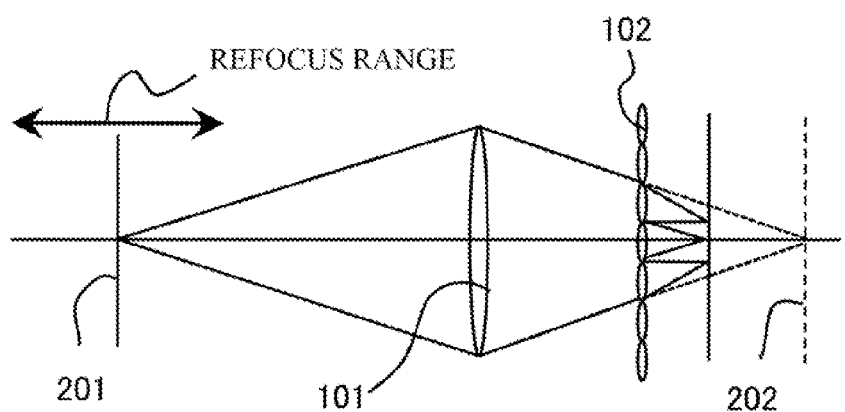
Figure 22C:
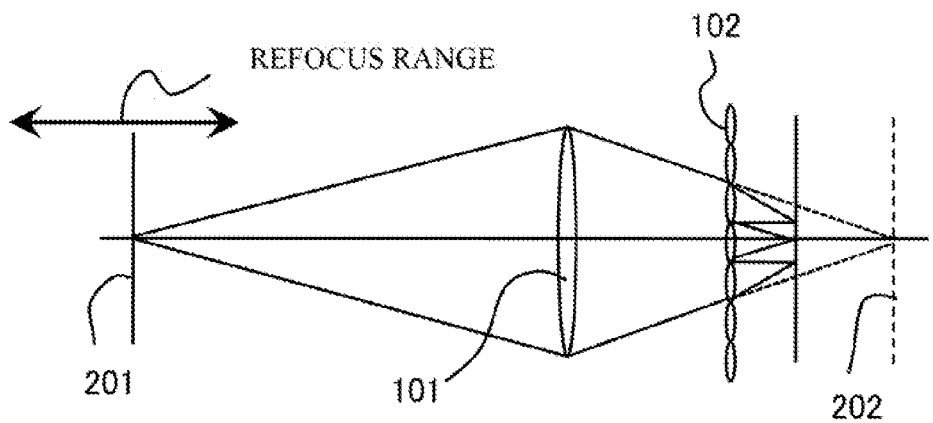

In the embodiment, the refocus range at the object side when the interval between the lens array 102 and the image pickup element 103 is changed is considered. In the configurations of FIGS. 2 and 3, centers of the refocus range are represented in FIGS. 21A to 21C and FIGS. 22A to 22C, respectively. In FIGS. 21A to 21C and FIGS. 22A to 22C, the interval between them is changed by moving only the lens array 102 while the image pickup element 103 is fixed, and in the configurations of FIGS. 2 and 3, the same discussion is applied even when the image pickup element 103 is moved. FIGS. 21A and 22A illustrate refocus ranges before the lens array 102 is moved. FIGS. 21B and 22B illustrate refocus ranges when the interval between the lens array 102 and the image pickup element 103 is simply changed. FIGS. 21C and 22C illustrate refocus ranges where a plane that is conjugate to the conjugate plane of the lens array 102 with respect to the image pickup element 103 via the imaging optical system 101 is moved to the object side when the interval is increased and is moved to the image side when the interval is decreased.

When the conjugate plane is not moved, as illustrated in FIGS. 21A and 21B and FIGS. 22A and 22B, the focus position at the object side is changed between before and after the interval between the lens array 102 and the image pickup element 103 is changed. Since the refocus range is spread back and forth with reference to the focus position at which an image is shot, as illustrated in FIGS. 21B and 22B, there is a case in which the refocus range at the side of the image pickup apparatus is narrowed after the interval is changed. In order to avoid this, it is preferred that a focus unit of the imaging optical system 101 is moved and that the conjugate plane is also moved when the interval is changed. In this case, it is preferred that a plane that is conjugate to the conjugate plane of the lens array 102 with respect to the image pickup element 103 via the imaging optical system 101 is moved to the object side when the interval between the lens array 102 and the image pickup element 103 is increased, and on the other hand it is moved to the image side when the interval is decreased. Thus, as illustrated in FIGS. 21C and 22C, the refocus range can be extended back and forth.

When the interval between the lens array 102 and the image pickup element 103 is changed, it is preferred that the following Expression (7) be met.

$$0.50 < \frac{\sigma_1 \tau_2}{\sigma_2 \tau_1} \leq 1.00 \tag{7}$$

In Expression (7), symbol $\sigma_1$ denotes an interval between the object side principal plane of the lens array 102 and the conjugate plane of the lens array 102 with respect to the image pickup element 103 in a case where the F number of the imaging optical system 101 is minimized in a state where the focal length of the imaging optical system 101 is minimized. Symbol $\sigma_2$ denotes an interval between the image side principal plane of the lens array 102 and the image pickup element 103 in the same state. Symbol $\tau_2$ denotes an interval between the object side principal plane of the lens array 102 and the conjugate plane of the lens array 102 with respect to the image pickup element 103 in a state where each of the focal length and the F number of the imaging optical system 101 is an arbitrary value. Symbol $\tau_2$ denotes an interval between the image side principal plane of the lens array 102 and the image pickup element 103 in the same state.

Subsequently, Expression (7) will be described. In the image pickup optical system illustrated in FIGS. 2 and 3, the spatial resolution of the image is changed in accordance with the change of the interval between the lens array 102 and the image pickup element 103. This is because $\Delta x$ is changed in accordance with the change of the interval. The value of $\Delta x$ is $|\tau_1/\tau_2|$ times as large as the pixel pitch $\Delta$ in the state where each of the focal length and the F number of the imaging optical system 101 is an arbitrary value. Considering the case where the F number of the imaging optical system 101 is minimized as a reference in a state where the focal length of the imaging optical system 101 is minimized, Expression (7) represents a ratio of a one-dimensional spatial resolution in an arbitrary state with respect to the spatial resolution of the reference state. In other words, Expression (7) indicates that the spatial resolution is not extremely changed by the change of the interval between the lens array 102 and the image pickup element 103. When a value is smaller than the lower limit of Expression (7), the deterioration of the spatial resolution is worsened. On the other hand, a value exceeds the upper limit of Expression (7), the interval between the lens array 102 and the image pickup element 103 is changed so as to decrease the value of $\Delta x$. When the value of $\Delta x$ is decreased, the number of pixels corresponding to an arbitrary position on the object plane 201 is decreased, and therefore the amount of the angle component of the obtained light field is reduced and the accuracy of the obtained light field is deteriorated.

In the present embodiment, it is more preferred that the following Expression (7a) be met.

$$0.75 < \frac{\sigma_1 \tau_2}{\sigma_2 \tau_1} \leq 1.00 \tag{7a}$$

As a result, the change of the spatial resolution is further suppressed so that the decreases of the amount and the accuracy of the obtained light field can be suppressed.

Furthermore, in this case, it is preferred that the interval between the lens array 102 and the image pickup element 103 be changed so as to meet the following Expression (8).

$$1.0 \leq \frac{\tau_1^2 \sigma_2}{\tau_2 \sigma_1^2} \frac{P}{P + \tau_1 - \tau_2 - \sigma_1 + \sigma_2 - \omega} \leq 4.5 \tag{8}$$

In Expression (8), symbol P denotes an interval between the exit pupil of the imaging optical system 101 and the image side conjugate plane 202 in a state where each of the focal length and the F number of the imaging optical system 101 is an arbitrary value. Hereinafter, symbol P is referred to as an exit pupil distance. Symbol $\omega$ denotes an increment of the interval between the exit pupil of the imaging optical system 101 and the image pickup element 103 that is caused by the change of the interval between the lens array 102 and the image pickup element 103.

FIGS. 18A to 18C illustrate relationships between the exit pupil distance P and the increment $\omega$. When the interval between the exit pupil of the imaging optical system 101 and the image pickup element 103 is shortened, the increment $\omega$ has a negative value. Expression (8) represents that the interval between the lens array 102 and the image pickup element 103 is changed in a direction where the value of $\Delta u$ is reduced when the pupil of the imaging optical system 101 is varied. When the value of $\Delta u$ is decreased, the refocus range represented by Expression (1) is increased. Therefore, in a state where the pupil of the imaging optical system 101 is varied, a ratio of the refocus ranges between before and after the change of the interval between the lens array 102 and the image pickup element 103 is obtained. The refocus range before the change can be represented by the following Expression (9).

$$\alpha_+ - \alpha_- \sim 2\frac{N_b F_b \sigma_1}{P_b \Delta \sigma_2} = 2\frac{\sigma_1^2}{P_b \Delta \Delta_{LA} \sigma_2} \quad (9)$$

In Expression (9), symbol $N_b$ denotes a one-dimensional division number of the pupil of the imaging optical system 101 before the change of the interval between the lens array 102 and the image pickup element 103. This corresponds to a ratio of the length of the exit pupil plane 101*b* on a certain azimuth cross section with respect to the sampling pitch on the exit pupil plane 101*b*. For example, $N_b=3$ is met in FIG. 2. Symbol $F_b$ denotes an F number of the imaging optical system 101 before changing the interval between the lens array 102 and the image pickup element 103, and symbol $P_b$ denotes an exit pupil distance in this case. In Expression (9), an approximation is used since the value of $\Delta$ is sufficiently small.

On the other hand, the refocus range after the change of the interval between the lens array 102 and the image pickup element 103 is represented by the following Expression (10).

$$\alpha_+ - \alpha_- \sim 2\frac{NF_{\tau_1}}{P\Delta_{\tau_2}} = 2\frac{\tau_1^2}{P\Delta\Delta_{LA}\tau_2}\frac{P}{P+\tau_1-\tau_2-\sigma_1+\sigma_2-\omega} \quad (10)$$

In Expression (10), symbol N denotes a one-dimensional division number of the pupil of the imaging optical system 101 after the interval is changed. Expression (8) is obtained by calculating a ratio of Expression (10) with respect to Expression (9). In this case, P to $P_b$ are used. When a value exceeds the lower limit of Expression (8), the interval between the lens array 102 and the image pickup element 103 is changed so as to increase the value of $\Delta u$. On the other hand, when the value exceeds the upper limit of Expression (8), the spatial resolution is significantly deteriorated by the change of the interval. In the present embodiment, it is more preferred that a range of the following Expression (8a) be met. Keeping the value within such ranges, the deterioration of the spatial resolution is further reduced, and therefore the decrease of the amount of the information of the obtained light field and the deterioration of the accuracy can be reduced.

$$1.0 \le \frac{\tau_1^2 \sigma_2}{\tau_2 \sigma_1^2}\frac{P}{P+\tau_1-\tau_2-\sigma_1+\sigma_2-\omega} \le 2.5 \quad (8a)$$

In the present embodiment, $\Delta=0.0043$ (mm), $\sigma_1=16.4540$ (mm), and $\sigma_2=1.1082$ (mm) are met. The minimum F number of the imaging optical system 101 is 2.9, and the focal length of the small lens that constitutes the lens array 102 is 1.1882 mm. In addition, the lens array 102 is moved while the image pickup element 103 is fixed, and therefore $\omega=0.0$ is met.

Figure 24A:
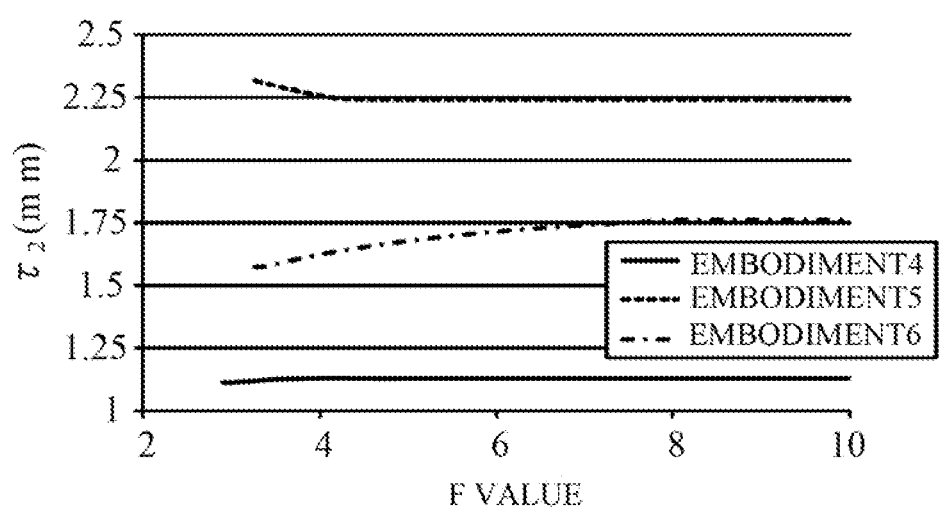
FIGS. 24A to 24D are diagrams of illustrating relationships between an aperture (F number) and $\tau_2$, $\tau_1$, Expression (7), and Expression (8), respectively, in each of Embodiments 4 to 6.

FIGS. 24A to 24D are diagrams of illustrating the relationships between the aperture (the F number) and $\tau_2, \tau_1$, Expression (7), and Expression (8), respectively. In each of FIGS. 24A to 24D, the relationships in the present embodiment are indicated by solid lines. The solid line in FIG. 24A indicates a change of the interval $\tau_2$ between the lens array 102 and the image pickup element 103 in a case where the F number is changed by narrowing the aperture of the imaging optical system 101. In FIG. 24A, a horizontal axis indicates the F number (the aperture) of the imaging optical system 101, and a vertical axis indicates $\tau_2$. Although the F number of the horizontal axis is plotted up to 10, the imaging optical system 101 can also indicate a value greater than 10.

Figure 24B:
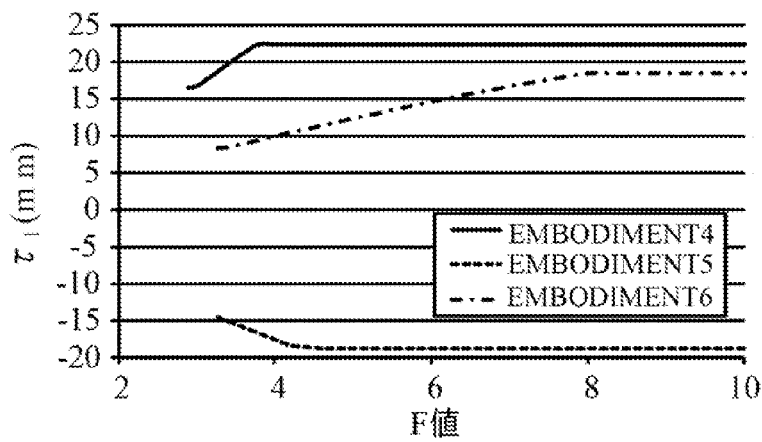
Figure 24C:
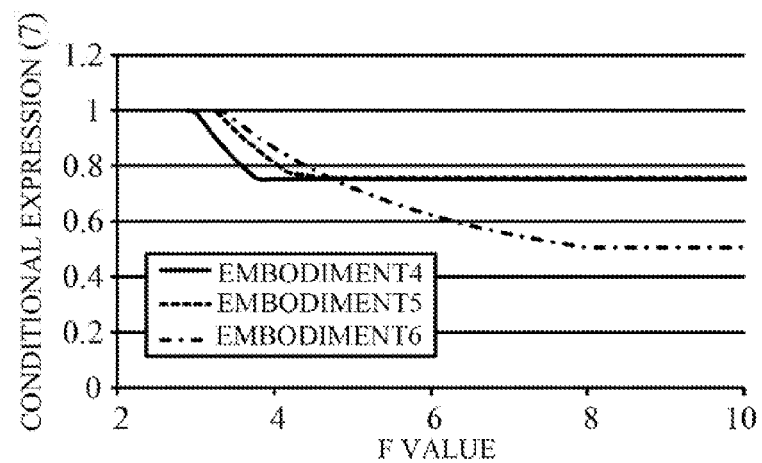
Figure 24D:
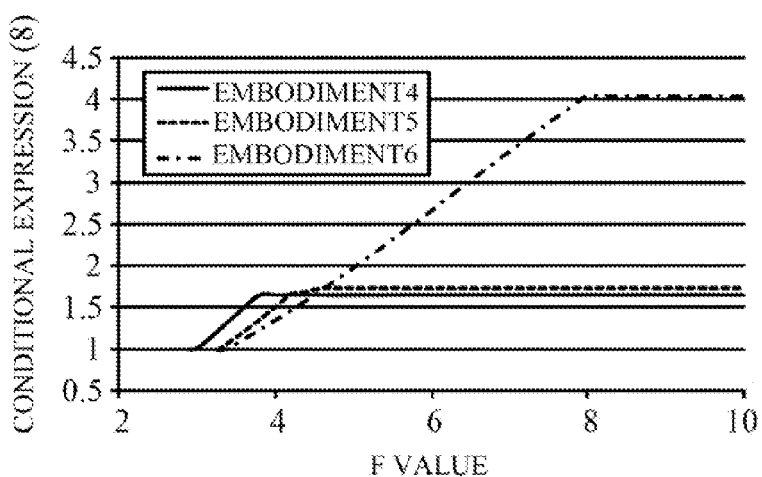

The solid lines in FIGS. 24B to 24D indicate the values of $\tau_1$, Expressions (7), and Expression (8) in this case, respectively. Each of the horizontal axes in FIGS. 24B to 24D is the same as that of FIG. 24A, and the vertical axes in FIGS. 24B to 24D indicate the values of $\tau_1$, Expressions (7), and Expression (8), respectively. As illustrated in FIGS. 24C and 24D, the values in FIGS. 24C and 24D are within the ranges of Expressions (7) and (8), respectively. Referring to FIG. 24B, as the F number is increased by the movement of the lens array 102, the interval between the lens array 102 and the conjugate plane of the lens array 102 with respect to the image pickup element 103 is increased. The vertical axis of FIG. 24C indicates a ratio of the one-dimensional spatial resolution after the lens array 102 is moved with respect to the one-dimensional spatial resolution before the lens array 102 is moved. As illustrated in FIG. 24C, in the present embodiment, the lens array 102 is moved so that the one-dimensional spatial resolution ensures not less than 75% of the one-dimensional spatial resolution before the lens array 102 is moved. Because of this, the values of $\tau_1$ and $\tau_2$ are constant from the F number of around 3.8.

Next, FIG. 24D will be described. The vertical axis of FIG. 24D indicates a ratio of the refocus range after the lens array 102 is moved with respect to the refocus range before it is moved. Therefore, when this value is not less than 1, it means that the accuracy of the obtained light field is improved by the change of the interval between the lens array 102 and the image pickup element 103. In the present embodiment, since the value of Expression (8) is not less than 1, the accuracy of the obtained light field is improved.

Embodiment 5

Next, Embodiment 5 of the present invention will be described. Since a basic configuration of an image pickup apparatus in the present embodiment is the same as the image pickup apparatus of Embodiment 1 described with reference to FIG. 4, descriptions thereof is omitted. An image pickup optical system of the present embodiment has the configuration illustrated in FIG. 2 and its cross section is illustrated in FIG. 25.

Figure 25:
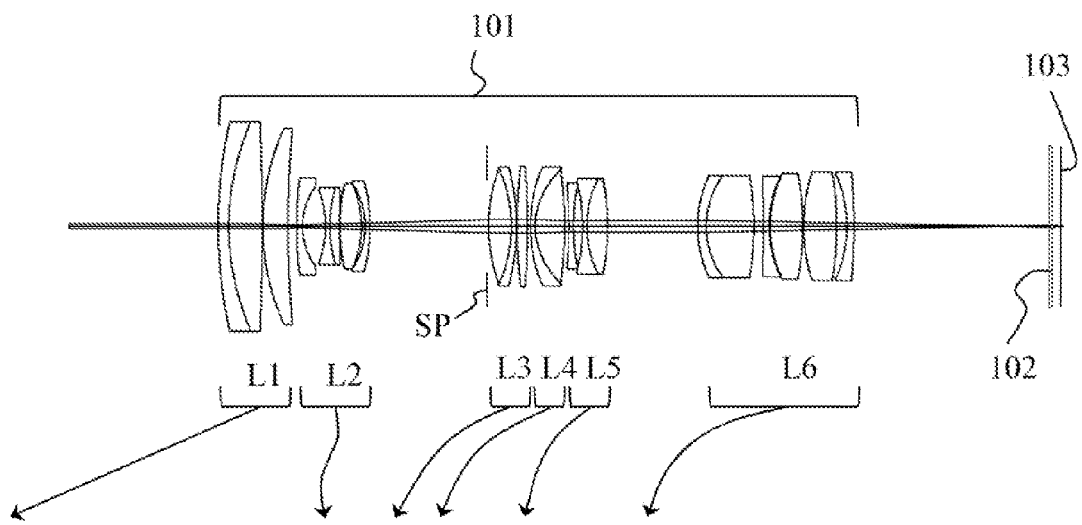
FIG. 25 is a cross-sectional diagram of the image pickup optical system in Embodiment 5.

The imaging optical system 101 illustrated in FIG. 25 is a zoom lens. The imaging optical system 101 includes a first lens unit L1 having a positive refractive power, a second lens unit L2 having a negative refractive power, and a third lens unit L3 having a positive refractive power. Furthermore, the imaging optical system 101 includes a fourth lens unit L4 having a positive refractive power, a fifth lens unit L5 having a negative refractive power, and a sixth lens unit L6 having a positive refractive power. The imaging optical system 101 changes an interval of each of the lens units in varying the magnification, and performs an in-focus operation using the second lens unit L2. The lens array 102 is formed by small lenses each having a planar shape at the object side and a convex shape at the image side. The lens array 102 is moved in accordance with the variation of the pupil (the position or the size of the pupil) caused by varying the magnification or performing the focusing of the imaging optical system 101, or narrowing the aperture. A method of driving the lens array 102 is the same as the method of Embodiment 1. As a result, even when the pupil of the imaging optical system 101 is varied, the decrease of the amount of the information of the obtained light field and the deterioration of the accuracy of the obtained light field can be reduced.

In the present embodiment, $\Delta=0.0064$ (mm), $\sigma_1=-14.6518$ (mm), and $\sigma_2=2.3125$ (mm) are met. Since the lens array 102 is disposed at the object side relative to the conjugate plane of the lens array 102 with respect to the image pickup element 103, $\sigma_1$ indicates a negative value. The minimum F number at the wide-angle end of the imaging optical system 101 is 3.27, and the focal length of the small lens that constitutes the lens array 102 is 1.9973 mm. In addition, the lens array 102 is moved while the image pickup element 103 is fixed, $\omega=0.0$ is met.

The dashed line in FIG. 24A indicates the change of the interval $\tau_2$ from the lens array 102 to the image pickup element 103 in a case where the F number is changed by narrowing the aperture at the wide-angle end of the imaging optical system 101. The dashed lines in FIGS. 24B to 24D indicate the values of $\tau_1$, Expression (7), and Expression (8) in this case, respectively. As illustrated in FIGS. 24C and 24D, the values in FIGS. 24C and 24D are within the ranges of Expressions (7) and (8), respectively. Referring to FIG. 24B, as the F number is increased by the movement of the lens array 102, the value of $|\tau_1|$ increases. This means that the interval between the conjugate plane of the lens array 102 with respect to the image pickup element 103 and the lens array 102 is increased. The values of $\tau_1$ and $\tau_2$ are constant from the F number of around 4.4 since the spatial resolution ratio is set so as to be not less than 0.75 as indicated by the dashed line of FIG. 24C. In addition, since the value of the dashed line of FIG. 24D is not less than 1, the decrease of the amount of the information of the obtained light field and the deterioration of the accuracy of the obtained light field are reduced due to the movement of the lens array 102.

Figure 26:
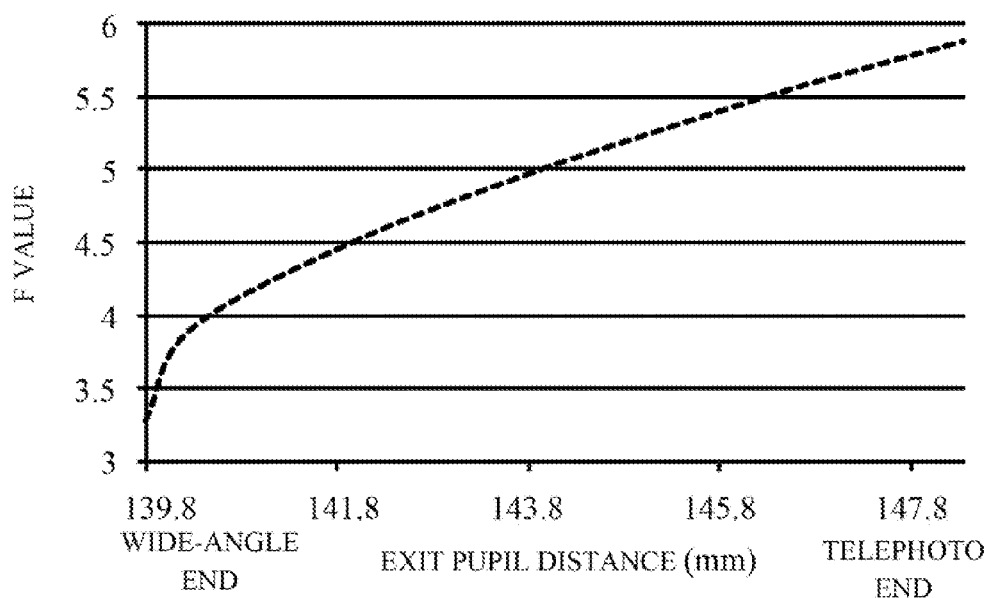
FIG. 26 is a diagram of illustrating a relationship between a magnification of the imaging optical system (an exit pupil distance) and the F number in each of Embodiments 5 and 6.

Next, the change of the interval between the lens array 102 and the image pickup element 103 in a case where the magnification of the imaging optical system 101 is varied will be described. The imaging optical system 101 has focal lengths of 28.9 mm at the wide-angle end and 291.4 mm at the telephoto end. FIG. 26 illustrates the change of the F number of the imaging optical system 101 in a case where the magnification is varied from the wide-angle end to the telephoto end in the full-open state of the aperture. In FIG. 26, the exit pupil distance of the horizontal axis indicates a distance from the exit pupil of the imaging optical system 101 to the image side focal point of the imaging optical system 101. In the present embodiment, the exit pupil distance is minimized at the wide-angle end, and is maximized at the telephoto end. Therefore, the sampling pitch of the light field is increased by increasing the magnification. Referring to FIG. 26, it is understood that the F number is increased by increasing the magnification and it is considered that the dead zone is also increased.

Figure 27A:
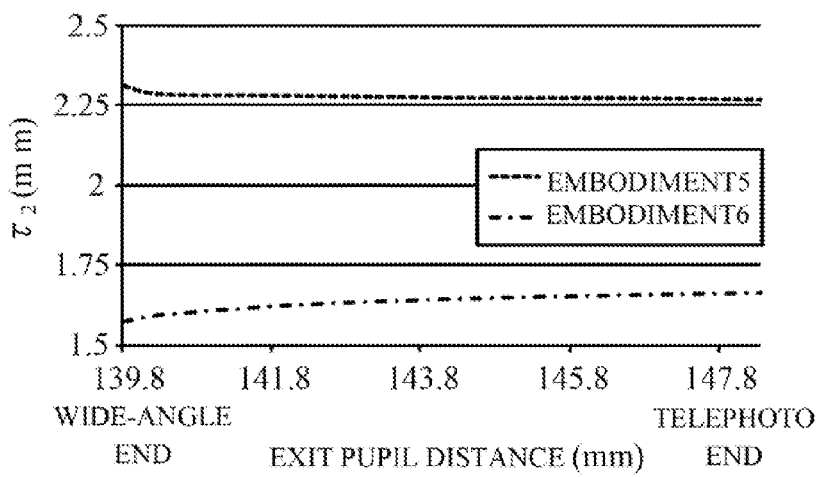
FIGS. 27A to 27D are diagrams of illustrating relationships between the magnification (the exit pupil distance) and $\tau_2$, $\tau_1$, Expression (7), and Expression (8), respectively, in each of Embodiments 5 and 6.
Figure 27B:
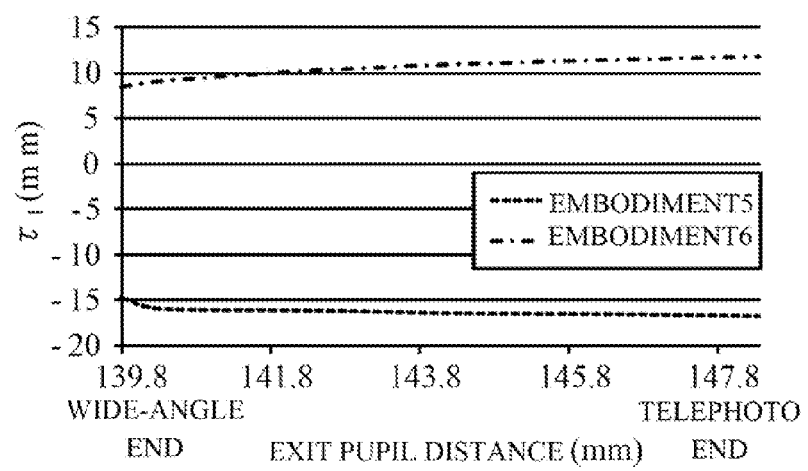
Figure 27C:
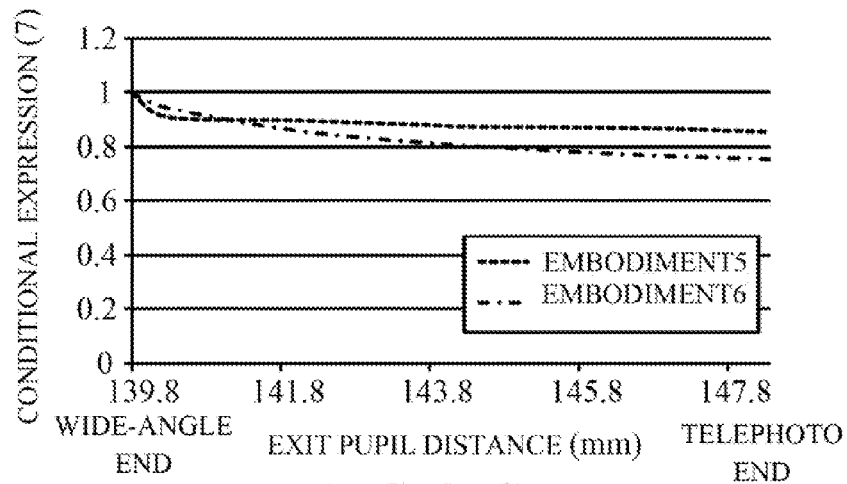
Figure 27D:
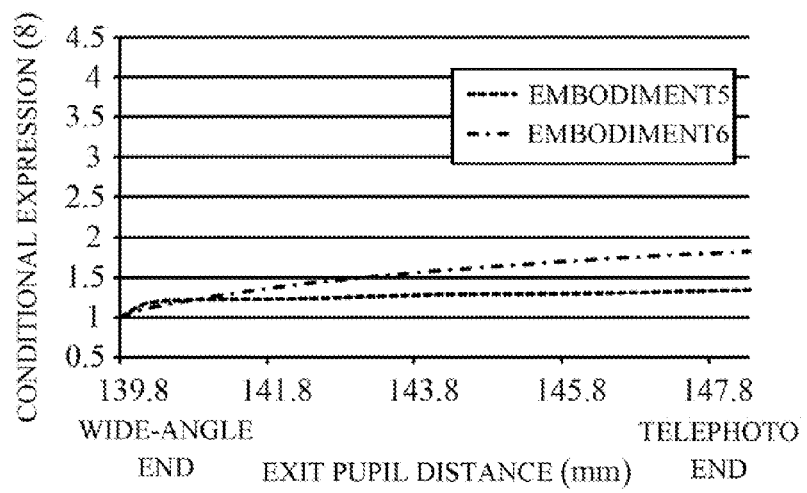

FIGS. 27A to 27D are diagrams of illustrating the relationships between the magnification (the exit pupil distance) and $\tau_2$, $\tau_1$, Expression (7), and Expression (8), respectively. In each of FIGS. 27A to 27D, the dashed lines indicate the relationships in the present embodiment. The dashed line in FIG. 27A indicates the change of the interval $\tau_2$ between the lens array 102 and the image pickup element 103 for varying the magnification. The dashed lines in FIGS. 27B to 27D indicate the values of $\tau_1$, Expression (7), and Expression (8) at the time of varying the magnification, respectively. As illustrated in FIGS. 27C and 27D, the values are within the ranges of Expressions (7) and (8), respectively. Referring to FIG. 27B, it is understood that $\tau_2$ is increased as the exit pupil is moved to the object side due to the movement of the lens array 102. As a result, the decrease of the amount of the information of the obtained light field and the deterioration of the accuracy can be reduced. The effect can be read by the indication that the dashed line in FIG. 27D indicates the value not less than 1. The one-dimensional spatial resolution ratio with respect to that before the lens array 102 is moved, as illustrated in FIG. 27C, ensures at least 85%.

Embodiment 6

Figure 28:
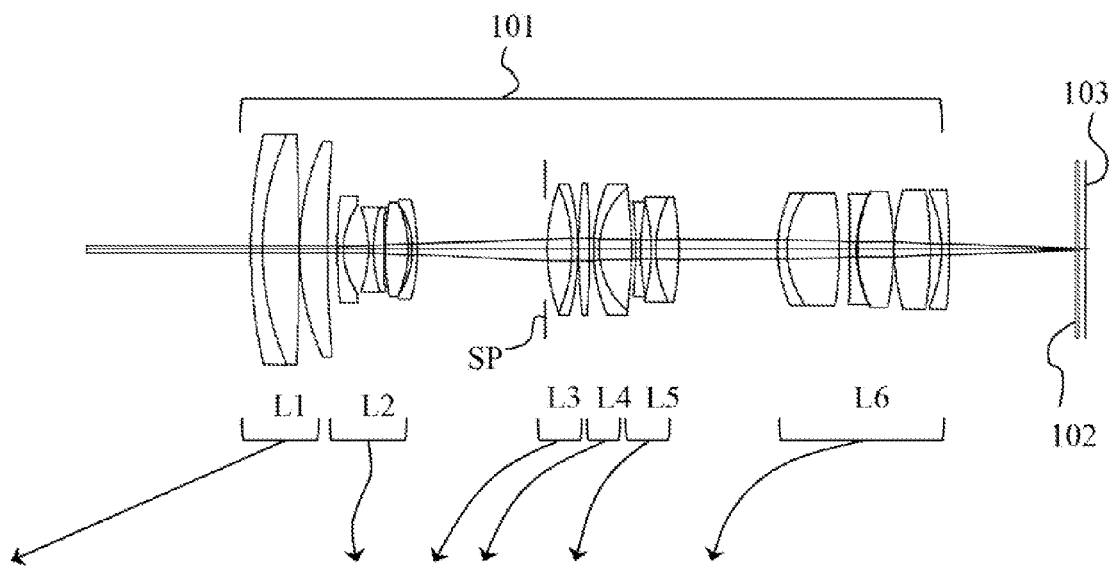
FIG. 28 is a cross-sectional diagram of the image pickup optical system in Embodiment 6.

Next, Embodiment 6 of the present invention will be described. In the present embodiment, an image processing system to which the image pickup apparatus described above is applied is described. The image processing system of the present embodiment has a configuration similar to that of Embodiment 3 described with reference to FIG. 17. The image pickup apparatus 301 has an image pickup optical system that has the configuration of FIG. 3. FIG. 28 is a cross-sectional diagram of the image pickup optical system in the present embodiment. In the present embodiment, other configurations such as an image processing apparatus 302 are similar to those of Embodiment 3. In addition, drive portions of the imaging optical system 101 and the lens array 102 of the image pickup apparatus 301 are similar to those of Embodiment 1. Accordingly, descriptions thereof are omitted.

In the present embodiment, $\Delta=0.0064$ (mm), $\sigma_1=8.3725$ (mm), and $\sigma_2=1.5742$ (mm) are met. The minimum F number of the imaging optical system 101 is 3.27 at the wide-angle end of the imaging optical system 101, and the focal length of the small lens that constitutes the lens array 102 is 1.9387 mm. In addition, the lens array 102 is moved while the image pickup element 103 is fixed, and therefore $\omega=0.0$ is met.

The dashed-dotted line in FIG. 24A indicates the change of $\tau_2$ in a case where the F number is changed by narrowing the aperture at the wide-angle end of the imaging optical system 101. FIGS. 24B to 24D illustrate the values of $\tau_1$, Expression (7), and Expression (8) in this case, respectively. As illustrated in FIGS. 24C and 24D, the values are within the ranges of Expressions (7) and (8), respectively. Referring to the dashed-dotted line in FIG. 24B, it is understood that $\tau_1$ is increased as the F number of the imaging optical system 101 is increased due to the movement of the lens array 102.

The values of $\tau_1$ and $\tau_2$ are constant from the F number of around 8.0 since the one-dimensional spatial resolution ratio is not less than 0.5 with respect to the case before the lens array 102 is moved as indicated by the dashed-dotted line of FIG. 24C. In addition, since the value of the dashed-dotted line of FIG. 24D is not less than 1, the decrease of the amount of the information of the obtained light field and the deterioration of the accuracy of the obtained light field are reduced due to the movement of the lens array 102.

Next, the change of the interval between the lens array 102 and the image pickup element 103 in a case where the magnification of the imaging optical system 101 is varied will be described. The changes of the exit pupil distance and the F number due to varying the magnification are as described in Embodiment 5. The dashed-dotted line in FIG. 27A indicates the change of $\tau_2$ for the magnification. The dashed-dotted lines in FIGS. 27B to 27D indicate the values of $\tau_1$, Expression (7), and Expression (8) at the time of varying the magnification, respectively. As illustrated in FIGS. 27C and 27D, the values in FIGS. 27C and 27D are within the ranges of Expressions (7) and (8), respectively. As illustrated in FIG. 27B, as the exit pupil is moved to the object side, the value of $\tau_1$ is increased. Furthermore, it is understood that the light field is efficiently obtained since the dashed-dotted line in FIG. 27D indicates not less than 1. The one-dimensional spatial resolution ratio with respect to that before the lens array 102 is moved, as illustrated in FIG. 27C, ensures at least 75%.

According to each of the embodiments described above, in a case where the position or the size of the pupil of the imaging optical system is changed, an image pickup apparatus that reduces the decrease of the amount of the information and the deterioration of the accuracy of the light field can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185403, filed on Aug. 29, 2011, which is hereby incorporated by reference herein in its entirety.

What is claimed is:

1. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the pupil is an exit pupil of the imaging optical system,
wherein the lens array is disposed on a conjugate plane of the imaging optical system with respect to the object plane, and
wherein the controller controls the interval between the lens array and the image pickup element so that a second interval in a case where a position of the exit pupil of the imaging optical system is located at a second position that is at an object side relative to a first position is larger than a first interval in a case where the position of the exit pupil of the imaging optical system is located at the first position when an F number of the imaging optical system is constant.

2. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the pupil is an exit pupil of the imaging optical system,
wherein the lens array is disposed on a conjugate plane of the imaging optical system with respect to the object plane, and
wherein the controller changes the interval between the lens array and the image pickup element so that a value that is obtained by dividing a pitch of the lens array by a sampling pitch on the exit pupil of the imaging optical system is increased when the exit pupil of the imaging optical system is moved to an object side.

3. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the pupil is an exit pupil of the imaging optical system,
wherein the lens array is disposed on a conjugate plane of the imaging optical system with respect to the object plane,
wherein the imaging optical system includes a focusing portion, and
wherein the focusing portion moves a plane conjugate to the lens array via the imaging optical system to a direction opposite to a moving direction of the lens array when the lens array is moved in accordance with the variation of the pupil of the imaging optical system.

4. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the pupil is an exit pupil of the imaging optical system,
wherein the lens array is disposed so that a conjugate plane of the imaging optical system with respect to the object plane and the image pickup element are conjugate to each other, and
wherein the controller controls an absolute value of a distance from an image side focal point of the lens array to the image pickup element so that a second absolute value of the distance in a case where a position of the exit pupil of the imaging optical system is located at a second position that is at an object side relative to a first position is smaller than a first absolute value of the distance in a case where the position of the exit pupil of the imaging optical system is located at the first position when an F number of the imaging optical system is constant.

5. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the pupil is an exit pupil of the imaging optical system,
wherein the lens array is disposed so that a conjugate plane of the imaging optical system with respect to the object plane and the image pickup element are conjugate to each other, and
wherein the controller changes the interval between the lens array and the image pickup element so that a value that is obtained by dividing a sampling pitch on a conjugate plane of the lens array with respect to the image pickup element by a sampling pitch on the exit pupil of the imaging optical system is increased when the exit pupil of the imaging optical system is moved to an object side.

6. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the pupil is an exit pupil of the imaging optical system,
wherein the lens array is disposed so that a conjugate plane of the imaging optical system with respect to the object plane and the image pickup element are conjugate to each other,
wherein the imaging optical system includes a focusing portion, and
wherein the focusing portion moves a plane conjugate to the conjugate plane of the lens array with respect to the image pickup element via the imaging optical system to an object side when the interval between the lens array and the image pickup element is increased, and moves the plane to an image side when the interval is decreased.

7. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a position of an exit pupil of the imaging optical system.

8. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element,
wherein the lens array is disposed on a conjugate plane of the imaging optical system with respect to the object plane, and
wherein when a position of an exit pupil of the imaging optical system in a second state is located at an object side relative to that in a first state, a second interval between the lens array and the image pickup element in the second state is larger than a first interval between the lens array and the image pickup element in the first state.

9. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the lens array is disposed on a conjugate plane of the imaging optical system with respect to the object plane, and
wherein the following expression is satisfied:

$$0.4 < \frac{\tau}{F\Delta_{LA}} < 1.2 \quad \left(F \le F_0 \frac{\Delta_{LA} + \Delta}{\Delta_{LA} - \Delta}\right)$$
$$0.4 < \frac{\tau}{F_0 \Delta_{LA}} \frac{\Delta_{LA} - \Delta}{\Delta_{LA} + \Delta} < 1.2 \quad \left(F > F_0 \frac{\Delta_{LA} + \Delta}{\Delta_{LA} - \Delta}\right),$$

where $F_0$ is a minimum value of an F number of the imaging optical system, F is the F number of the imaging optical system in an arbitrary state, $\Delta$ is a pixel pitch of the image pickup element, $\Delta_{LA}$ is a pitch of the lens array, and $\tau$ is an interval between the image side principal plane of the lens array and the image pickup element when the F number of the imaging optical system is F.

10. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element,
wherein the lens array is disposed so that a conjugate plane of the imaging optical system with respect to the object plane and the image pickup element are conjugate to each other, and
wherein when a position of an exit pupil of the imaging optical system in a second state is located at an object side relative to that in a first state, a second absolute value of a distance from an image side focal point of the lens array to the image pickup element in the second state is smaller than a first absolute value of the distance from the image side focal point of the lens array to the image pickup element in the first state.

11. An image pickup apparatus comprising:
an imaging optical system;
an image pickup element that includes a plurality of pixels;
a lens array configured so that a ray from the same position on an object plane enters the pixels different from each other of the image pickup element in accordance with a pupil region of the imaging optical system through which the ray passes; and
a controller configured to change an interval between the lens array and the image pickup element in accordance with a variation of a pupil of the imaging optical system,
wherein the lens array is disposed so that a conjugate plane of the imaging optical system with respect to the object plane and the image pickup element are conjugate to each other, and
wherein the following expression is satisfied:

$$0.50 < \frac{\sigma_1 \tau_2}{\sigma_2 \tau_1} \leq 1.00,$$

where $\sigma_1$ is an interval between an object side principal plane of the lens array and the conjugate plane of the lens array with respect to the image pickup element when an F number of the imaging optical system is minimized in a first state where a focal length of the imaging optical system is minimized, $\sigma_2$ is an interval between an image side principal plane of the lens array and the image pickup element in the first state, $\tau_1$ is an interval between the object side principal plane of the lens array and the conjugate plane of the lens array with respect to the image pickup element in a second state where each of the focal length and the F number of the imaging optical system is an arbitrary value, and $\tau_2$ is an interval between the image side principal plane of the lens array and the image pickup element in the second state.

12. The image pickup apparatus according to claim 11, wherein the following expression is satisfied:

$$1.0 \leq \frac{\tau_1^2 \sigma_s}{\tau_2 \sigma_1^2} \frac{P}{P + \tau_1 - \tau_2 - \sigma_1 + \sigma_2 - \omega} \leq 4.5,$$

where P is an interval between an exit pupil of the imaging optical system and a plane conjugate to the image pickup element via the lens array in a state where each of the focal length and the F number of the imaging optical system is an arbitrary value, and $\omega$ is an increment of an interval between the exit pupil of the imaging optical system and the image pickup element that is caused by a change of the interval between the lens array and the image pickup element.

* * * * *